US010436676B2

(12) United States Patent
Horlbeck et al.

(10) Patent No.: US 10,436,676 B2
(45) Date of Patent: Oct. 8, 2019

(54) METHOD AND APPARATUS FOR ENGINE ANALYSIS AND REMOTE ENGINE ANALYSIS

(75) Inventors: Eric G. Horlbeck, Chapel Hill, NC (US); John Thompson, Fuquay Varina, NC (US); Daniel McDonald, Youngsville, NC (US); Gregory Keith Chatham, Cary, NC (US); Emery Carr, Carrboro, NC (US); William A. Grubbs, Chapel Hill, NC (US)

(73) Assignee: Thompson Automotive Labs LLC, Fuquay Varina, NC (US)

( * ) Notice: Subject to any disclaimer, the term of this patent is extended or adjusted under 35 U.S.C. 154(b) by 512 days.

(21) Appl. No.: 14/235,575

(22) PCT Filed: Aug. 9, 2012

(86) PCT No.: PCT/US2012/050127
§ 371 (c)(1),
(2), (4) Date: Apr. 18, 2014

(87) PCT Pub. No.: WO2013/023046
PCT Pub. Date: Feb. 14, 2013

(65) Prior Publication Data
US 2014/0297157 A1    Oct. 2, 2014

Related U.S. Application Data

(60) Provisional application No. 61/641,493, filed on May 2, 2012, provisional application No. 61/521,934, filed on Aug. 10, 2011.

(51) Int. Cl.
G01M 15/12    (2006.01)
F02D 41/14    (2006.01)
(Continued)

(52) U.S. Cl.
CPC ......... *G01M 15/12* (2013.01); *F02D 41/1497* (2013.01); *G01L 1/10* (2013.01);
(Continued)

(58) Field of Classification Search
CPC ......... G01M 15/12; G01M 15/11; G01L 1/10; G01L 5/00; F02D 41/1497;
(Continued)

(56) References Cited

U.S. PATENT DOCUMENTS 4,083,234 A    4/1978  Aono et al.
4,424,709 A *  1/1984  Meier, Jr. .............. G01M 15/09
                                                    701/102
(Continued)

FOREIGN PATENT DOCUMENTS

GB    2442797 A    4/2008

OTHER PUBLICATIONS

Getman et al. "An Automated Network for Detecting Diesel Engine Misfire", *International Joint Conference on Neural Networks*, 2007, 3017-3021.
(Continued)

*Primary Examiner* — Xiao En Mo
(74) *Attorney, Agent, or Firm* — Sage Patent Group

(57) ABSTRACT

Methods of analyzing a cyclo-mechanical engine include detecting an engine signal associated with a plurality of cycles of the cyclo-mechanical engine, comparing a first sample of the engine signal with a second sample of the engine signal to determine a cycle length of the cyclo-mechanical engine, and analyzing the engine signal to detect a variation in the cycle length of the cyclo-mechanical engine over time based on the determined cycle length. Related systems and computer program products are also disclosed.

38 Claims, 17 Drawing Sheets

(51) Int. Cl.
  *G01M 15/11* (2006.01)
  *G01L 1/10* (2006.01)
  *G01L 5/00* (2006.01)
  *F02D 41/28* (2006.01)

(52) U.S. Cl.
  CPC .............. *G01L 5/00* (2013.01); *G01M 15/11* (2013.01); *F02D 2041/286* (2013.01); *F02D 2041/288* (2013.01); *F02D 2200/1015* (2013.01)

(58) Field of Classification Search
  CPC ....... F02D 2041/286; F02D 2200/1015; F02D 2041/288
  See application file for complete search history.

(56) References Cited

U.S. PATENT DOCUMENTS

| | | | |
|---|---|---|---|
| 5,400,592 A * | 3/1995 | Mukaihira | F01N 11/007 123/674 |
| 5,425,269 A | 6/1995 | Bradshaw | |
| 5,495,774 A | 3/1996 | Klauber et al. | |
| 5,503,007 A | 4/1996 | Plee et al. | |
| 5,668,725 A | 9/1997 | Naik | |
| 5,687,082 A | 11/1997 | Rizzoni | |
| 5,758,307 A | 5/1998 | Haefner et al. | |
| 6,067,847 A | 5/2000 | Staerzl | |
| 6,222,445 B1 | 4/2001 | Beckhusen | |
| 6,223,120 B1 | 4/2001 | Williams | |
| 6,338,326 B1 | 1/2002 | Ebeling et al. | |
| 6,651,490 B1 | 11/2003 | Ceccarani | |
| 6,810,320 B2 | 10/2004 | Yamamoto et al. | |
| 6,883,497 B2 | 4/2005 | Wozniak et al. | |
| 6,892,691 B1 * | 5/2005 | Uhl | F02B 77/04 123/198 A |
| 7,031,828 B1 | 4/2006 | Thompson et al. | |
| 7,142,972 B1 | 11/2006 | Naik | |
| 7,155,965 B2 | 1/2007 | Kim | |
| 7,162,397 B2 | 1/2007 | DeCarlo et al. | |
| 7,292,933 B2 | 11/2007 | Christensen | |
| 7,324,888 B1 | 1/2008 | Stotsky | |
| 7,530,261 B2 | 5/2009 | Walters | |
| 7,536,902 B2 | 5/2009 | Tsukamoto et al. | |
| 7,540,185 B2 | 6/2009 | Lewis | |
| 7,571,640 B2 | 8/2009 | Andrews | |
| 7,591,170 B2 | 9/2009 | Lin et al. | |
| 7,694,554 B1 | 4/2010 | Thompson | |
| 7,788,020 B2 | 8/2010 | Wolf et al. | |
| 7,801,671 B1 | 9/2010 | Pederson et al. | |
| 8,256,278 B2 | 9/2012 | Lee et al. | |
| 8,392,096 B2 | 3/2013 | Mathews et al. | |
| 8,471,742 B2 | 6/2013 | Lachartre | |
| 2005/0193804 A1 * | 9/2005 | Kokubo | F02D 35/024 73/35.12 |
| 2005/0251321 A1 * | 11/2005 | DeCarlo | G01M 15/046 701/114 |
| 2007/0050126 A1 * | 3/2007 | Nou | G07C 5/085 701/117 |
| 2007/0079785 A1 | 4/2007 | Moller et al. | |
| 2007/0157713 A1 | 7/2007 | Tsukamoto et al. | |
| 2008/0098806 A1 | 5/2008 | Shikama et al. | |
| 2008/0190184 A1 | 8/2008 | Walters | |
| 2010/0042311 A1 | 2/2010 | Nakai | |
| 2011/0072893 A1 * | 3/2011 | Malaczynski | F02D 41/1498 73/114.03 |
| 2011/0253101 A1 | 10/2011 | Mathews et al. | |
| 2014/0182548 A1 | 7/2014 | Thompson et al. | |

OTHER PUBLICATIONS

International Preliminary Report on Patentability Corresponding to International Application No. PCT/US2012/050127; dated Feb. 20, 2014; 11 Pages.
Jones et al. "A review of condition monitoring and fault diagnosis for diesel engines", *Tribotest*, 6: 267-291, 2000 (Abstract Only).
International Search Report and Written Opinion dated Oct. 16, 2012 for International Application No. PCT/US2012/050127 (19 pages).

* cited by examiner (1)

(2)

(3)

(4)

METHOD AND APPARATUS FOR ENGINE ANALYSIS AND REMOTE ENGINE ANALYSIS

RELATED APPLICATIONS

The present application claims the benefit of and priority to U.S. Provisional Patent Application No. 61/521,934, filed Aug. 10, 2011, entitled "METHODS AND APPARATUS FOR ENGINE ANALYSIS," and U.S. Provisional Patent Application No. 61/641,493, filed May 2, 2012, entitled "METHODS AND APPARATUS FOR REMOTE ENGINE ANALYSIS," the disclosures of which are hereby incorporated herein by reference in their entirety.

BACKGROUND

An engine is a device that generates mechanical motion. In general, an engine is any electromechanical device that converts energy, including electrical, chemical, heat, or any other type of energy, into mechanical motion. This includes, for example, internal combustion engines, steam engines, Carnot engines, Stirling engines, etc. A cyclo-mechanical engine is any engine that operates on a cycle to generate mechanical motion.

Internal combustion engines typically have one or more cylinders in which mechanical energy is generated by combustion of flammable materials. In an internal combustion engine, a piston is typically movably positioned within the cylinder and connected to a crankshaft by a rod. The movement of the piston turns the crankshaft providing motive force to the wheels of the vehicle.

Engines typically operate using a four stroke combustion cycle, also known as the Otto cycle. The four strokes are: 1) the intake stroke, where the piston moves from an in position to an out position, drawing fuel and air into the cylinder; 2) the compression stroke, where the piston moves from the out position to the in position, compressing the fuel and air mixture in the cylinder; 3) the combustion stroke, where a spark plug emits a spark, igniting the fuel and air mixture, causing an explosion that propels the piston to the out position; and 4) the exhaust stroke, where the piston moves back to the in position, forcing the exhaust fumes from the cylinder. Valves permit the introduction of fuel and air, and another valve allows the expulsion of the exhaust fumes.

The combustion cycle is made inefficient when a misfire occurs. A misfire is sometimes thought of as the total lack of combustion in a cylinder. More broadly, however, a misfire occurs any time the firing of a cylinder fails to release an expected amount of energy. A misfire, therefore, can be thought of as a total or partial lack of combustion in a cylinder.

Misfires can occur for many different reasons. For example, the spark plug may not be providing a spark to the compressed fuel/air mix. A bad fuel mix, which may be the result of a clogged fuel injector, a clogged air intake, or both, can cause a misfire to occur. Essentially, the fuel and the air are not being introduced into the cylinder in the proper ratio to achieve optimal combustion. A lack of compression, such as when the seals in the cylinder fail and allow the fuel/air mixture to leak out as the piston attempts to compress the mixture, can also lead to a misfire. Many other factors can contribute to a lack of complete combustion.

Misfires are a cause for concern for vehicle operators. When a misfire occurs, the fuel in the cylinder does not combust and is sent out the exhaust valve. This unburned fuel then passes out through the exhaust system of the vehicle. This results in lower fuel efficiency as well as additional wear and tear on catalytic converters.

Misfires, particularly those accompanied by partial combustion, may be difficult to detect.

SUMMARY

Some embodiments of the present invention provide methods of analyzing a cyclo-mechanical engine. The methods include detecting an engine signal associated with a plurality of cycles of the cyclo-mechanical engine, comparing a first sample of the engine signal with a second sample of the engine signal to determine a cycle length of the cyclo-mechanical engine, and analyzing the engine signal to detect a variation in the cycle length of the cyclo-mechanical engine over time based on the determined cycle length. In this regard, "associated" means any signal that is generated as a byproduct of engine operation.

Comparing the first sample of the engine signal with the second sample of the engine signal may include correlating the first sample with the second sample.

The methods may further include generating a frequency spectrum of the engine signal, and analyzing the frequency spectrum of the engine signal to determine if the frequency spectrum signal has a single dominant peak or multiple dominant peaks. In response to determining that the frequency spectrum has multiple dominant peaks, correlating the first sample with the second sample may include performing a first correlation operation, and in response to determining that the frequency spectrum has a single dominant peak, correlating the first sample with the second sample may include performing a second correlation operation that is different from the first correlation operation.

The first correlation operation may include maximum adjacent correlation.

Performing maximum adjacent correlation may include determining a minimum expected cycle length and a maximum expected cycle length, choosing a plurality of sections of the engine signal for analysis, defining a first correlation window at each section of the engine signal, the first correlation window having a length equal to the minimum expected cycle length, defining a second correlation window at each section of the signal, the second correlation window having a length equal to the first correlation window, and correlating a portion of each section of the engine signal covered by the first correlation window with a portion of each section of the engine signal covered by the second correlation window.

The methods may further include repeating steps of (a) increasing sizes of the first correlation window and the second correlation window in each section of the signal, and (b) correlating the portion of each section of the signal covered by the first correlation window with the portion of each section of the signal covered by the second correlation window, until the sizes of the first correlation window and the second correlation window are equal to the maximum expected cycle length.

The methods may further include identifying a correlation peak from results of the correlations.

The methods may further include sampling the engine signal at a first sampling rate, processing the engine signal at a second sampling rate that is lower than the first sampling rate to determine changes in engine speed over time, analyzing changes in engine speed to develop an estimate of engine speed variations over time, and processing the electronic sample at the first sampling rate to determine variation in engine speed over time in response to the estimate of engine speed variations over time.

The methods may further include discarding changes in engine speed that occur outside a predetermined range of engine speeds. Analyzing changes in engine speed to develop the estimate of engine speed variations over time may include analyzing the remaining changes in engine speed after discarding changes in engine speed are outside the predetermined range.

Detecting the engine signal may include detecting an acoustic signal associated with the engine and converting the acoustic signal into an electrical, signal. The acoustic signal may include an exhaust signal.

Detecting the engine signal may include at least one of detecting an electrical signal, an RE signal, a heat signal, an infrared signal, a vibration signal an optical signal, an airflow signal, and/or a mass flow signal, associated with the cyclo-mechanical engine. For example, detecting the engine signal may include detecting an alternator output signal.

In some embodiments, the engine includes a four-stroke internal combustion engine, and analyzing the engine signal includes analyzing a cycle corresponding to a 720-degree rotation of a crankshaft in the engine. In further embodiments, the engine includes a two-stroke internal combustion engine, and analyzing the engine signal includes analyzing a cycle corresponding to a 360-degree rotation of a crankshaft in the engine.

Analyzing the engine signal to detect a variation in the cycle length of the engine may include generating a plurality of engine cycle length estimates. The methods may further include refining the engine cycle length estimates by aligning signal sections from adjacent durations. In this context, aligning means superimposing the signals that correspond to identified cycles to show how similar they are to each other.

Aligning signal sections from adjacent durations may include choosing a starting point for a first cycle duration, choosing a starting point for a second cycle duration adjacent the first cycle duration by starting with the duration length of the first cycle duration and shifting the second cycle duration by a number of samples that increases a correlation between the first duration cycle and the second cycle duration.

Determining lengths of third and subsequent cycle durations may include shifting the cycle durations by a number of samples that maximizes a correlation with any of a previous N number of cycle durations, where N>1.

The methods may further include receiving a cylinder timing signal from the cyclo-mechanical engine, and comparing the cylinder timing signal with the engine signal to identify which of a plurality of cylinders in the cyclo-mechanical engine is misfiring. The cylinder timing signal may include, for example, a spark plug signal, a signal output by a cam sensor, or a signal output by a crank sensor in the cyclo-mechanical engine.

Some embodiments provide methods of analyzing a cyclo-mechanical engine having a fundamental basis cycle length including detecting an engine signal associated with a plurality of fundamental basis cycles of the engine, and analyzing the engine signal to detect a variation in the cycle length of the fundamental basis cycle of the engine.

The cyclo-mechanical engine may include an internal combustion engine having a 720 degree fundamental basis cycle.

Some further embodiments are directed to methods of analyzing a cyclo-mechanical engine including detecting an engine signal associated with a plurality of cycles of the engine, analyzing the engine signal to estimate cycle lengths of the engine at a plurality of locations in the engine signal, refining the cycle length estimates to generate refined cycle length estimates, and identifying cycle length variations in response to the refined cycle length estimates. Refining the cycle length estimates may include aligning signal sections from adjacent durations by choosing a starting point for a first duration, and choosing a starting point for a second duration adjacent the first duration by starting with the duration length of the first duration and shifting the second duration by a number of samples that maximizes a correlation between the first duration and the second duration.

Determining lengths of third and subsequent durations may include shifting the durations by a number of samples that maximizes a correlation with any of a previous N number of durations, where N>1.

Some embodiments of the present invention provide a computer program product for analyzing a cyclo-mechanical engine, the computer program product including a tangible computer readable storage medium having computer readable program code embodied in the medium. The computer readable program code may include computer readable program code configured to detect an engine signal associated with a plurality of cycles of the cyclo-mechanical engine, computer readable program code configured to compare a first sample of the engine signal with a second sample of the engine signal to determine a cycle length of the cyclo-mechanical engine, and computer readable program code configured to analyze the engine signal to detect a variation in the cycle length of the cyclo-mechanical engine over time based on the determined cycle length.

The computer program product may further include computer readable program code configured to generate a frequency spectrum of the engine signal, and computer readable program code configured to analyze the frequency spectrum of the engine signal to determine if the frequency spectrum of the engine signal has a single dominant peak or multiple dominant peaks. The computer program product may further include computer readable program code configured to correlate the first sample with the second sample by performing a first correlation operation in response to determining that the frequency spectrum has multiple dominant peaks, and computer readable program code configured to correlate the first sample with the second sample by performing a second correlation operation that is different from the first correlation operation in response to determining that the frequency spectrum has a single dominant peak.

The computer program product may further include computer readable program code configured to perform maximum adjacent correlation by determining a minimum expected cycle length and a maximum expected cycle length, choosing a plurality of sections of the engine signal for analysis, defining a first correlation window at each section of the engine signal, the first correlation window having a length equal to the minimum expected cycle length, defining a second correlation window at each section of the engine signal, the second correlation window having a length equal to the first correlation window, and correlating a portion of each section of the engine signal covered by the first correlation window with a portion of each section of the engine signal covered by the second correlation window.

The computer program product may further include computer readable program code configured to repeat steps of (a) increasing sizes of the first correlation window and the second correlation window in each section of the engine signal, and (b) correlating the portion of each section of the engine signal covered by the first correlation window with the portion of each section of the engine signal covered by the second correlation window, until the sizes of the first correlation window and the second correlation window are equal to the maximum expected cycle length.

The computer program product may further include computer readable program code configured to identify a correlation peak from results of the correlations.

The computer program product may further include computer readable program code configured to sample the engine signal at a first sampling rate, computer readable program code configured to process the engine signal at a second sampling rate that is lower than the first sampling rate to determine changes in engine speed over time, computer readable program code configured to analyze changes in engine speed to develop an estimate of engine speed variations over time, and computer readable program code configured to process the electronic sample at the first sampling rate to determine variation in engine speed over time in response to the estimate of engine speed variations over time.

The computer program product may further include computer readable program code configured to discard changes in engine speed that occur outside a predetermined range of engine speeds and to analyze the remaining changes in engine speed after discarding changes in engine speed that occur at higher than the threshold rate.

The computer program product may further include computer readable program code configured to analyze the engine signal to detect a variation in the cycle length of the engine by generating a plurality of engine cycle length estimates and refining the engine cycle length estimates by aligning engine signal sections from adjacent durations.

The computer program product may further include computer readable program code configured to align engine signal sections from adjacent durations by choosing a starting point for a first cycle duration, choosing a starting point for a second cycle duration adjacent the first cycle duration by starting with the duration length of the first cycle duration and shifting the second cycle duration by a number of samples that increases a correlation between the first duration cycle and the second cycle duration.

The computer program product may further include computer readable program code configured to determine lengths of third and subsequent cycle durations by shifting the cycle durations by a number of samples that maximizes a correlation with any of a previous N number of cycle durations, where N>1.

Some further embodiments of the present invention provide a computer program product for analyzing a cyclo-mechanical engine having a fundamental basis cycle length, the computer program product including a tangible computer readable storage medium having computer readable program code embodied in the medium. The computer readable program code may include computer readable program code configured to detect an engine signal associated with a plurality of fundamental basis cycles of the engine, and computer readable program code configured to analyze engine the signal to detect a variation in the cycle length of the fundamental basis cycle of the engine.

Some further embodiments of the present invention provide a computer program product for analyzing a cyclo-mechanical engine, the computer program product including a tangible computer readable storage medium having computer readable program code embodied in the medium. The computer readable program code may include computer readable program code configured to detect an engine signal associated with a plurality of cycles of the engine, computer readable program code configured to analyze the signal to estimate cycle lengths of the engine at a plurality of locations in the engine signal, computer readable program code configured to refine the cycle length estimates to generate refined cycle length estimates, and computer readable program code configured to identify cycle length variations in response to the refined cycle length estimates.

The computer program product may further include computer readable program code configured to refine the cycle length estimates by aligning engine signal sections from adjacent durations by choosing a starting point for a first duration, choosing a starting point for a second duration adjacent the first duration, and shifting the second duration by a number of samples that increases a correlation between the first duration and the second duration.

Some embodiments of the present invention provide systems for analyzing a cyclo-mechanical engine. The systems include a sensor configured to detect an engine signal associated with a plurality of cycles of the cyclo-mechanical engine and to generate a sensor signal in response to the engine signal, and an engine speed analyzer configured to compare a first sample of the sensor signal with a second sample of the sensor signal to determine a cycle length of the cyclo-mechanical engine, and to analyze the sensor signal to detect a variation in the cycle length of the cyclo-mechanical engine over time based on the determined cycle length.

The engine speed analyzer may be configured to generate a frequency spectrum of the sensor signal, and to analyze the frequency spectrum of the sensor signal to determine if the frequency spectrum signal has a single dominant peak or multiple dominant peaks. The engine speed analyzer may further be configured to correlate the first sample with the second sample by performing a first correlation operation in response to determining that the frequency spectrum has multiple dominant peaks, and to correlate the first sample with the second sample by performing a second correlation operation that is different from the first correlation operation in response to determining that the frequency spectrum has a single dominant peak.

The engine speed analyzer may further be configured to perform maximum adjacent correlation by determining a minimum expected cycle length and a maximum expected cycle length, choosing a plurality of sections of the sensor signal for analysis, defining a first correlation window at each section of the signal, the first correlation window having a length equal to the minimum expected cycle length, defining a second correlation window at each section of the sensor signal, the second correlation window having a length equal to the first correlation window, and correlating a portion of each section of the sensor signal covered by the first correlation window with a portion of each section of the signal covered by the second correlation window.

The engine speed analyzer may further be configured to repeat steps of (a) increasing sizes of the first correlation window and the second correlation window in each section of the sensor signal, and (b) correlating the portion of each section of the sensor signal covered by the first correlation window with the portion of each section of the sensor signal covered by the second correlation window, until the sizes of the first correlation window and the second correlation window are equal to the maximum expected cycle length.

The engine speed analyzer may further be configured to identify a correlation peak from results of the correlations.

The engine speed analyzer may further be configured to sample the sensor signal at a first sampling rate, to process the sensor signal at a second sampling rate that is lower than the first sampling rate to determine changes in engine speed over time, to develop an estimate of engine speed variations over time, and to process the electronic sample at the first sampling rate to determine variation in engine speed over time in response to the estimate of engine speed variations over time.

The engine speed analyzer may further be configured to discard changes in engine speed that occur outside a predetermined range of engine speeds and to analyze the remaining changes in engine speed after discarding changes in engine speed that occur at higher than the threshold rate.

The engine speed analyzer may further be configured to analyze the sensor signal to detect a variation in the cycle length of the engine by generating a plurality of engine cycle length estimates and refining the engine cycle length estimates by aligning signal sections from adjacent durations.

The engine speed analyzer may further be configured to align signal sections from adjacent durations by choosing a starting point for a first cycle duration, choosing a starting point for a second cycle duration adjacent the first cycle duration by starting with the duration length of the first cycle duration and shifting the second cycle duration by a number of samples that increases a correlation between the first duration cycle and the second cycle duration.

The engine speed analyzer may further be configured to determine lengths of third and subsequent cycle durations by shifting the cycle durations by a number of samples that maximizes a correlation with any of a previous N number of cycle durations, where N>1.

Some further embodiments of the present invention provide a system for analyzing a cyclo-mechanical engine having a fundamental basis cycle length. The system may include a sensor configured to generate a sensor signal in response to an engine signal associated with a plurality of cycles of the cyclo-mechanical engine, and an engine speed analyzer configured to analyze the sensor signal to detect a variation in the cycle length of the fundamental basis cycle of the engine.

Still further embodiments of the present invention provide a system for analyzing a cyclo-mechanical engine, the system including a sensor configured to generate a sensor signal in response to an engine signal associated with a plurality of cycles of the cyclo-mechanical engine, and an engine speed analyzer configured to analyze the sensor signal to estimate cycle lengths of the engine at a plurality of locations in the signal, to refine the cycle length estimates to generate refined cycle length estimates, and to identify cycle length variations in response to the refined cycle length estimates.

It is noted that aspects of the inventive concepts described with respect to one embodiment may be incorporated in a different embodiments although not specifically described relative thereto. That is, all embodiments and/or features of any embodiments can be combined in any way and/or combination. These and other objects and/or aspects of the present inventive concepts are explained in detail in the specification set forth below.

Other systems, methods, and/or computer program products will be or become apparent to one with skill in the art upon review of the following drawings and detailed description. It is intended that all such additional systems, methods, and/or computer program products be included within this description, be within the scope of the present inventive concepts, and be protected by the accompanying claims.

BRIEF DESCRIPTION OF THE DRAWINGS

The accompanying drawings are included to provide a further understanding of the disclosure and are incorporated in and constitute a part of this application. In the drawings.

DETAILED DESCRIPTION

Figure 1B:
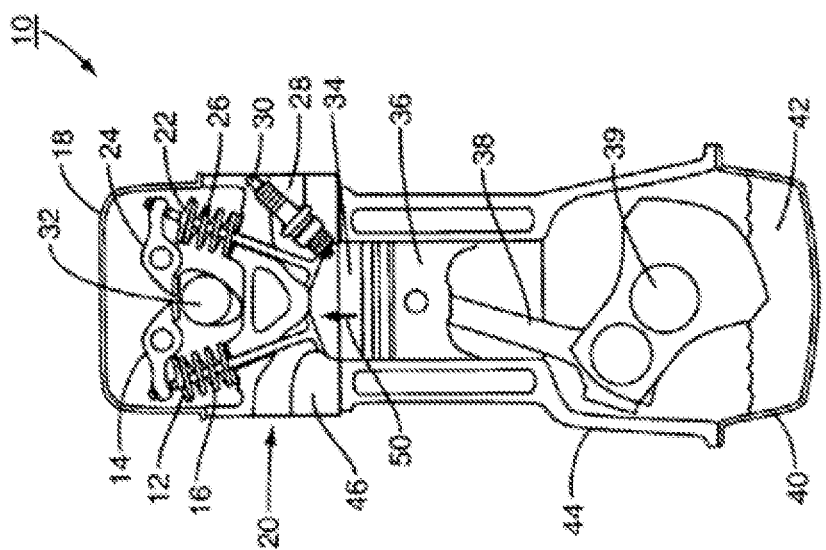
FIGS. 1A to 1D are cross sectional views of an internal combustion engine showing various aspects of a four-stroke engine cycle.

Embodiments of the present invention are described herein with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

There is presently a need for methods and/or apparatus that allow an automotive technician to analyze the performance of an engine. For example, a technician may need to determine if any of an engine's cylinders are misfiring, on vehicles outside the scope of on-board diagnostics (OBD) II regulations, such as heavy duty, diesel and pre-OBD II vehicles. Moreover, there is a need for systems/methods outside of the vehicle's onboard OBD II system that can determine if any of an engine's cylinder(s) are misfiring. It may also be desirable to determine if an engine is running smoothly, with little or no variation in engine speed under constant conditions, such as at idle.

Embodiments of the present invention can be used to analyze many different types of engines. As used herein, the term "engine" includes any engine, motor or other electro-mechanical device that converts energy, including electrical, chemical, heat, or any other type of energy, into mechanical motion. This includes, for example, internal combustion engines, electric motors, steam engines, Carnot engines, Stirling engines, etc. A cyclo-mechanical engine is any engine that operates on a cycle to generate mechanical motion.

Some embodiments of the invention identify variations in engine speed, which can indicate likely misfire activity and/or other problematic conditions, from any of a variety of signals derived from a running engine that contain information of the repeating patterns of the engine's cycle. An example of such a signal is the sound from the engine's exhaust. However, other signals, such as electrical signals within the vehicles electrical system can be used.

Some embodiments of the invention utilize a combination of remote signal processing (e.g., signal processing performed at the location of the engine) and central processing (e.g., processing performed at a location remote from the engine) for automotive diagnostics. In particular, some embodiments can identify variations in engine speed by collecting engine-related data at the engine and transmitting the data to a remote location for processing. Some pre-processing of the data can occur before it is transmitted to the remote location. Some vehicles include systems that transmit diagnostic data, such as fault codes, collected by an onboard controllers in the vehicle to a remote location. However, such systems may not actually process the data to diagnose or analyze the engine.

As an engine operates, it produces a repeating pattern of vibrations and/or electrical/electromagnetic patterns as it repeats its engine cycle. Some embodiments of the invention detect changes to this repeating pattern to infer instantaneous changes in the speed of the engine. Some patterns of change may indicate misfire activity. Some embodiments provide a process for inferring misfire activity due to the presence of these patterns.

FIGS. 1A to 1D illustrate operation of a four-stroke an internal combustion engine that operates according to the Otto cycle. The engine 10 includes an intake valve 12 controlled in part by a rocker arm 14 and a spring 16. A valve cover 18 may be positioned over the intake valve 12. The intake valve 12 is positioned in an intake port 20. Collec-tively this forms the intake of the engine. While not illustrated, it should be understood that a fuel injector and an air intake are fluidly coupled to the intake port 20.

On the exhaust side, an exhaust valve 22 is controlled in part by a rocker arm 24 and a spring 26. The exhaust valve 22 is positioned in an exhaust port 28. The valve cover 18 may also cover the exhaust valve 22. A spark plug 30 may be positioned proximate the exhaust valve 22. A camshaft 32 has cam surfaces that sequentially trigger rocker arms 14 and 24 as camshaft 32 rotates.

The intake port 20 and the exhaust port 28 are selectively fluidly connected to the cylinder 34. A piston 36 is positioned within the cylinder 34. The piston 36 is connected to a rod 38 which in turn is connected to a crankshaft 39. The crankshaft 39 dips into oil pan 40 so that oil in oil sump 42 may be used to lubricate the moving parts of the engine 10. The engine 10 is enclosed by engine block 44 and head 46.

During operation, the engine 10 goes through four stages of the Otto cycle. FIG. 1A illustrates the intake stroke. During the intake stroke, the piston 36 moves from an in position to an out position (illustrated generally by arrow 48). Intake valve 12 is open, allowing a fuel and air mixture to flow into the cylinder 34. Exhaust valve 22 is closed.

Figure 1A:
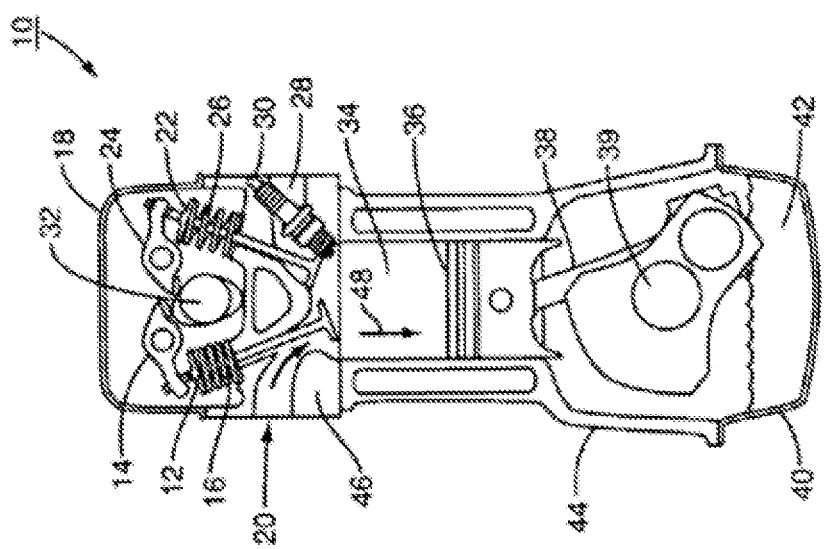

FIG. 1B illustrates the compression stroke. The piston 36' moves from the out position to the in position (illustrated generally by arrow 50). Both the intake valve 12 and the exhaust valve 22 are closed. This compresses the fuel and air mixture.

Figure 1C:
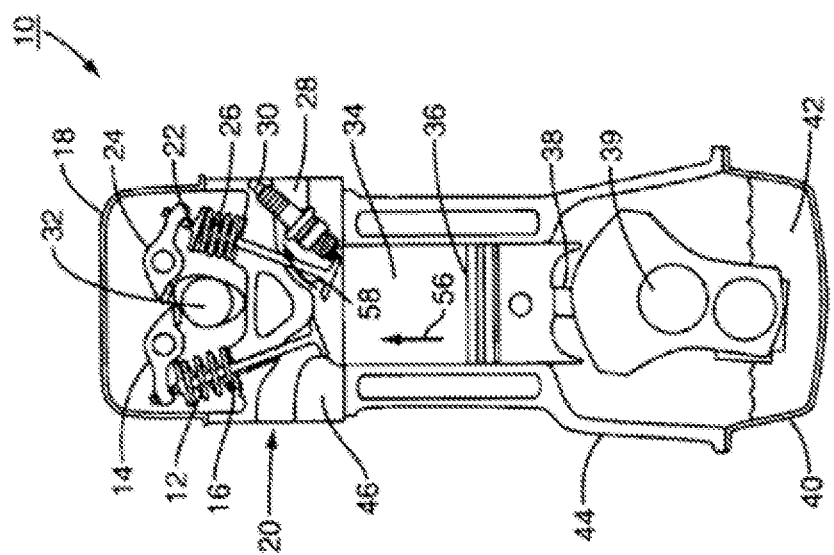

FIG. 1C illustrates the combustion stroke. The spark plug 30 emits a spark 52, which causes the fuel and air mixture to ignite and explode. The force of the explosion pushes the piston 36 to the out position (illustrated generally by arrow 54), which in turn pushes the crankshaft 39 and provides the motive force. Both intake valve 12 and the exhaust valve 22 remain closed.

Figure 1D:
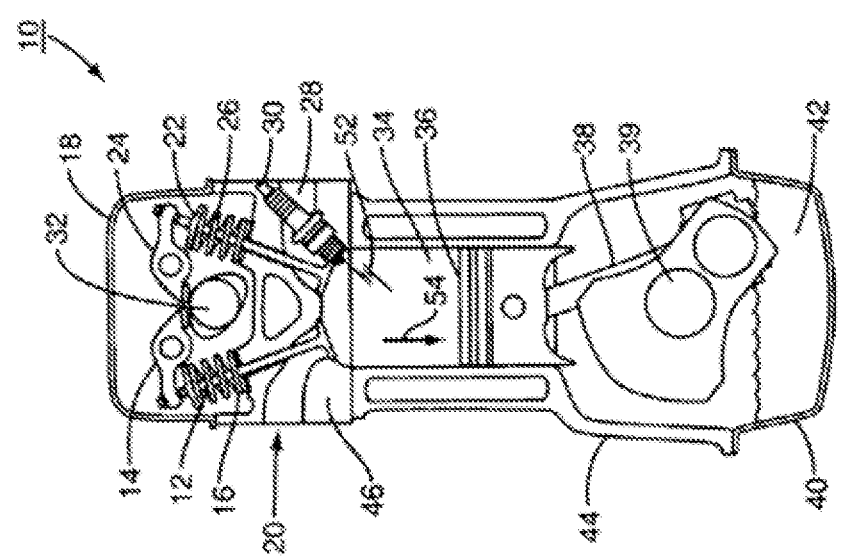

FIG. 1D illustrates the exhaust stroke. The exhaust valve 22 opens, and the piston 36 moves from the out position to the in position (illustrated generally by arrow 56), pushing the contents of the cylinder 34 out through the exhaust port 28 (illustrated generally by arrow 58).

A misfire occurs in the engine 10 when the firing of a cylinder fails to release an expected amount of energy. For example, a misfire may occur when the fuel/air mixture in the cylinder fails to ignite, ignites incompletely, or otherwise fails to increase pressure in the cylinder by an expected amount when it ignites. For example, a misfire can occur if the spark plug fails to provide an adequate spark, if the air/fuel mixture is out of balance, and/or if there is a loss of compression in the cylinder during the compression cycle. A misfire can have a number of detrimental effects, including loss of power, emission of unignited hydrocarbons through the engine exhaust, backfiring, etc.

Figure 2:
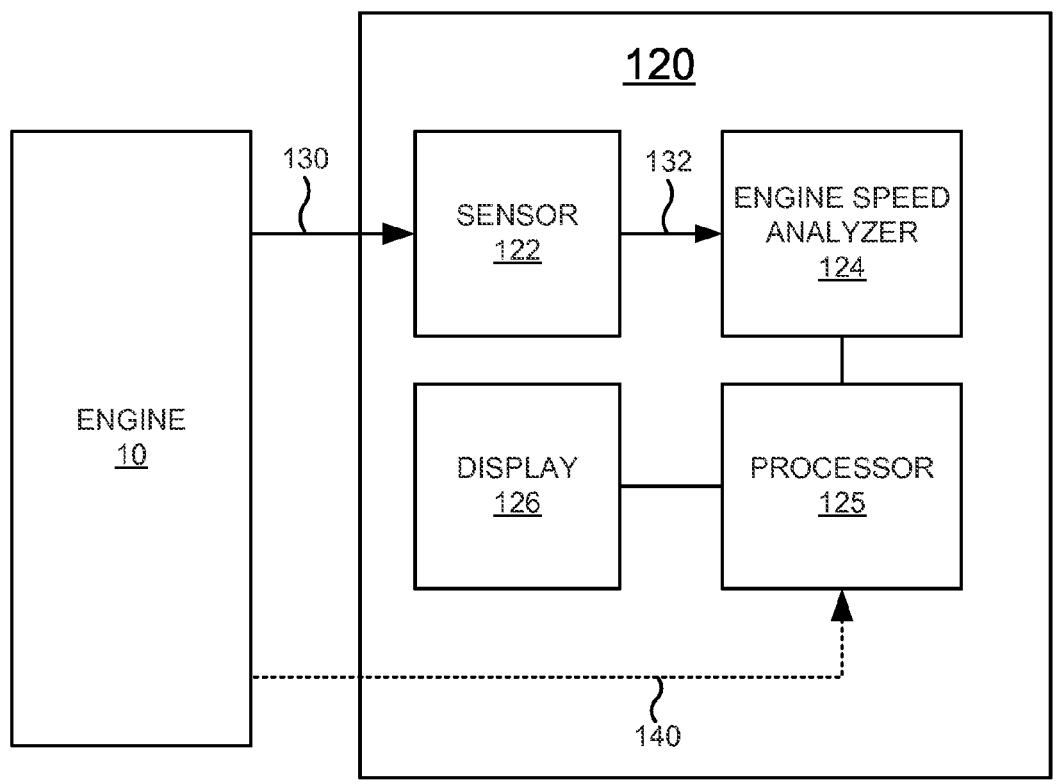
FIG. 2 is a block diagram illustrating an apparatus according to some embodiments.

A system 120 for analyzing an engine according to some embodiments is illustrated schematically in FIG. 2. As shown therein, the system 120 includes a sensor 122 and an engine speed analyzer 124. The sensor 122 may sense a signal 130 associated with an engine 10 and responsively generate a sensor output signal 132, where "associated" means any signal that is generated as a byproduct of engine operation. The signal may in some embodiments be an electronic signal. Alternatively, the sensor 122 can sense a non-electronic signal 130, such as an audible signal, a vibration signal, an electromagnetic signal, etc., associated with the engine 10, and generate the sensor output signal 132 in response to the non-electronic signal. In that case, the sensor 122 can include a transducer that generates an electronic sensor output signal 132 in response to an audible signal 130 associated with the engine 10. The engine speed analyzer 124 analyzes the sensor output signal 132. From this analysis, the engine speed analyzer 124 may identify the occurrence of a misfire condition in the engine 10 as described in detail below.

The signal 130 can be detected using a microphone placed in the exhaust pipe, a directional microphone attached to the vehicle, an airflow sensor in the air intake or exhaust, a MAF sensor, an RF sensor near the engine, a vibration sensor attached to the vehicle, an optical sensor arranged to determine vibration by measuring deflection of a laser, an electrical sensor attached to the electrical system of the vehicle, such as by being plugged into a 12V power outlet. In some embodiments, an optical sensor may be used to measure the movement of a belt, gear, sprocket, timing chain, or other moving part of an engine.

In embodiments in which a belt sensor is analyzed, it is possible to detect variations in engine speed within a single engine cycle.

The system 120 further includes a processor 125 and a display 126 that can determine and indicate what remediation is appropriate for a detected misfire. For example, the processor 125 can examine the output of the engine speed analyzer 124 and determine what service on the engine is recommended or desired based on the severity of the engine rpm variability or misfire activity. In some embodiments, if the misfire activity indicates that the misfires are likely due to dirty or clogged valves, the processor 125 can identify a strength and/or composition of chemical cleaner that is recommended to remediate the misfire problem for the engine being analyzed. The results may be displayed on the display 126.

The processor 125 may optionally be configured to receive a cylinder timing signal 140 from the engine 10 that may be used to determine a firing order of cylinders in the engine 10. The cylinder timing signal 140 can be obtained, for example from a spark plug connector of one of the cylinders to provide a spark timing point. Alternatively, the cylinder timing signal can be obtained from a cam sensor or crank sensor in the engine 10. By comparing the cylinder timing signal 140 with the analysis of the sensor output signal 132, the processor 125 can identify which particular cylinder(s) are misfiring. This information can be displayed to a user of the system 120 via the display 126.

Figure 3:
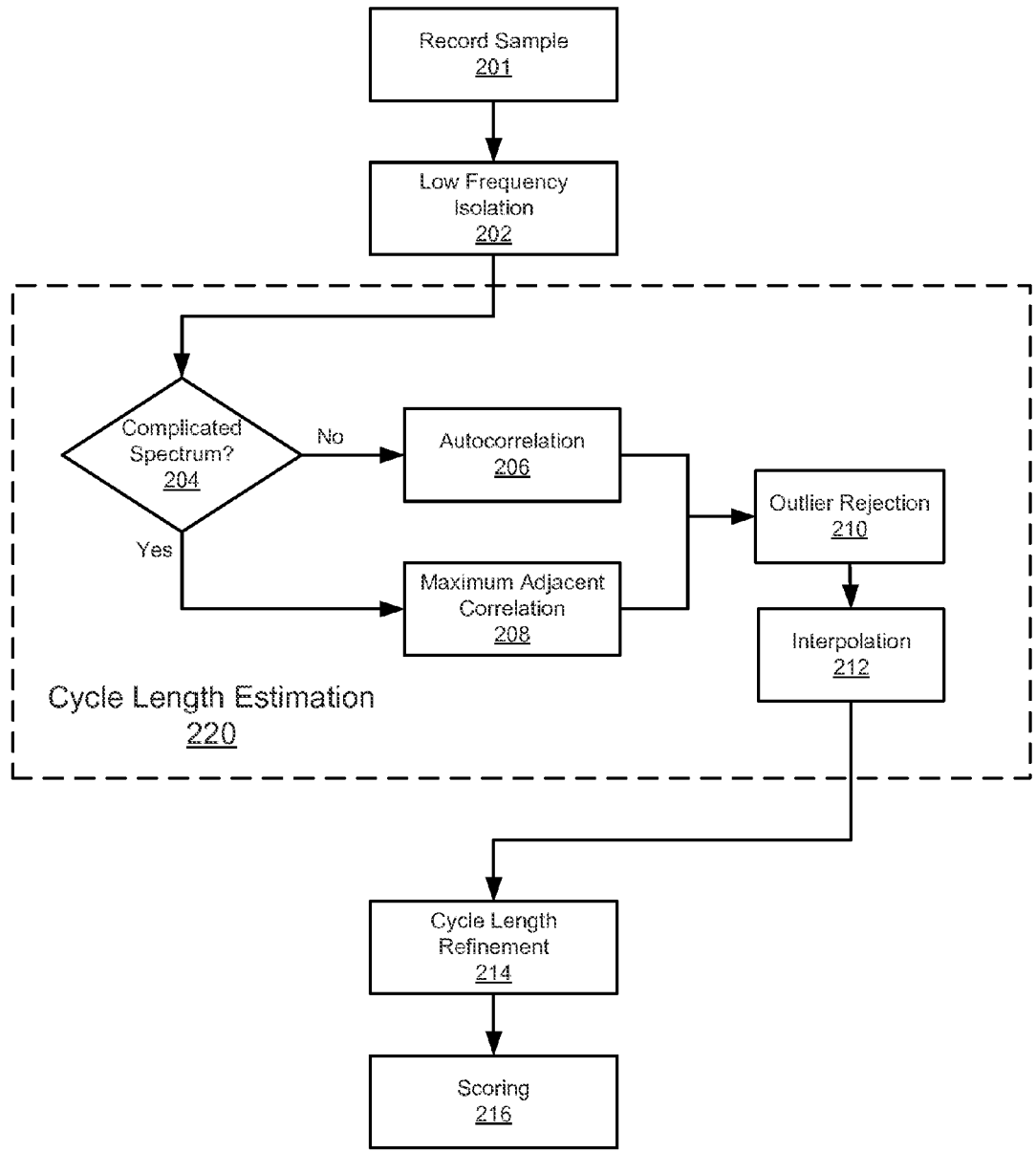
FIG. 3 is flowchart illustrating operations of systems/methods according to some embodiments.

FIG. 3 is a flowchart of operations of a system 12 according to some embodiments. Referring to FIGS. 2 and 3, initially, a sample of the signal 130 output by the sensor 122 is recorded by the misfire analyzer 124 (Block 201). In some cases, a misfire can be detected in a sample of the signal 130 that is less than a second. However, it is typically desirable to record a longer sample. For example, if an engine is misfiring every 20 seconds on the average, it may not be possible to detect a misfire using a measurement sample that is less than 20 seconds long. Some embodiments record a sample of the signal 130 that is about 1 minute long.

The signal 130 can be digital or analog. However, an analog signal may be digitized for analysis. Some embodiments may use a digital audio signal obtained from the engine exhaust sampled at 44,100 Hz. For example, a microphone may be used to detect the sound coming from the exhaust. A signal can also be obtained using (i) a microphone in the intake manifold, (ii) a voltage sensor on the electrical system (including the cigarette lighter), (iii) electromagnetic sensor near the engine (detecting radio signals created by the engine's electrical system), (iv) a microphone near the engine suspended from the raised hood of the vehicle, (v) a piezo sensor (or microphone) attached to the body of the vehicle, and/or any other similar signal acquisition apparatus.

Figure 4:
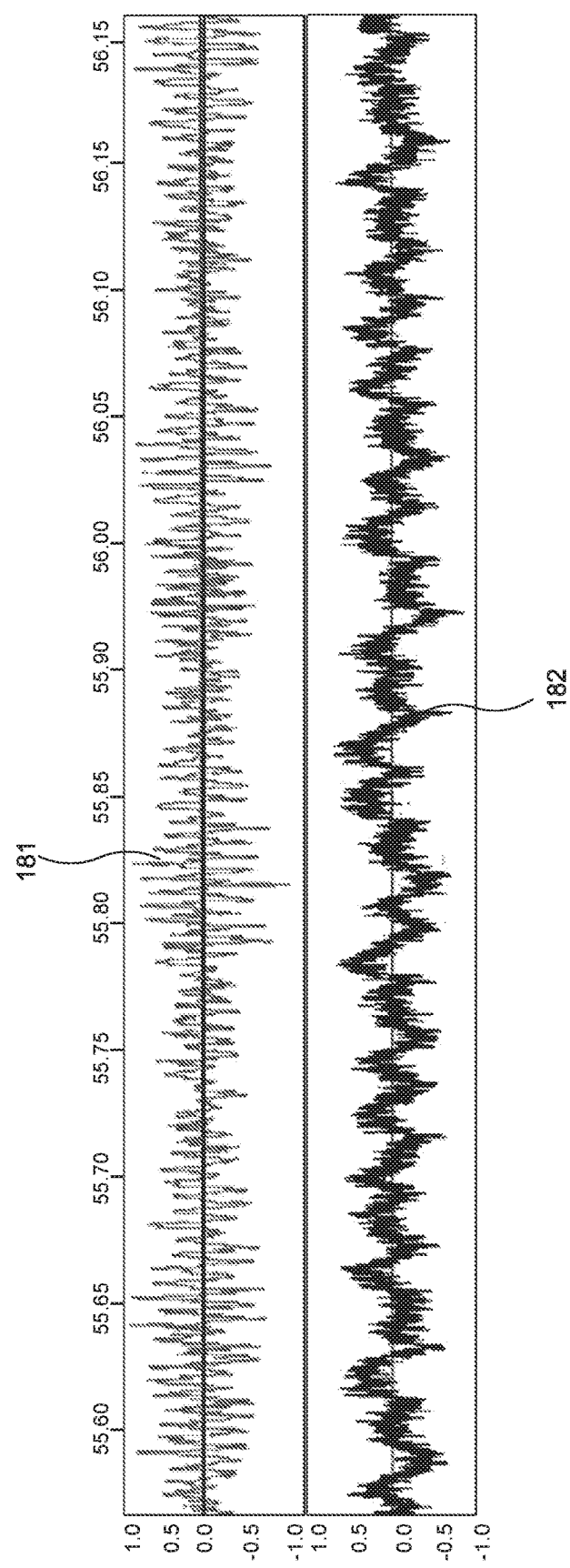
FIG. 4 illustrates an example of an audio signal sample recorded from an engine exhaust, and a DC-adjusted electrical signal sample recorded from a cigarette lighter of a car during engine operation

FIG. 4 illustrates an example of an audio signal sample 181 (upper portion of the graph) recorded from an engine exhaust, and a DC-adjusted electrical signal sample 182 (lower portion of the graph) recorded from a cigarette lighter of a car during engine operation. These samples can be analyzed in accordance with the methods described herein to determine the presence or absence of a misfire condition.

Returning to FIGS. 2 and 3, in preparation for misfire detection, the signal 130 may be filtered using, for example, a low pass filter (Block 202). The signal 130 may include numerous high frequency signal components that correspond to sources other than the 720 degree engine cycle, as well as reflections and resonances in the signal path and other noise. The signal 130 may be passed through a low pass filter to reduce these components of the signal. In general, the low pass filter may have a cutoff frequency selected to be high enough to retain signal components associated with the 720-degree engine cycle yet low enough to reject undesirable signal components, such as high frequency components associated with the presence of stators in the engine's alternator.

In some embodiments, a fourth order Butterworth filter may be applied twice to the signal, once forward in time and then once in reverse to reduce impact on the phase of the signal.

Each direction may have a −3 db cutoff point at a frequency corresponding to 900 RPM, which is expected to be higher than the idle speed of the engine under test. It will be appreciated that the actual cutoff frequency in cycles per second (Hertz) is based on the number of cylinders of the engine. For example, an 8-cylinder engine will experience 8 cylinder firings per 720 degrees of rotation, or four cylinder firings per revolution of the crankshaft. For an 8-cylinder engine, therefore, 900 RPM corresponds to a frequency of 900*4/60 Hz, or 60 Hz.

Accordingly, filter parameters for a fourth order Butterworth filter may depend on the number of cylinders in the engine being analyzed, as shown in Table 1.

TABLE 1

| Filter design parameters | |
|---|---|
| No. of cylinders | Normalized cutoff frequency (in half cycles/sample) |
| 3 | 0.00102040816327 |
| 4 | 0.00136054421769 |
| 5 | 0.00170068027211 |
| 6 | 0.00204081632653 |
| 8 | 0.00272108843537 |

Information about the number of cylinders in the engine may be obtained in some embodiments by scanning and decoding the vehicle identification number (VIN) of the vehicle and/or reading information from the vehicle's OBD2 port. The VIN may include information about the vehicle, such as its make, model, year, options, engine type, etc. The systems/methods disclosed herein may choose a particular algorithm, filter parameters, etc., based on information derived from the VIN.

Next, cycle length estimation is performed (Block 220). The length of the fundamental basis cycle of the engine (i.e., the "duration") is then estimated at various times throughout the recorded sample of the signal 130. In the case of a four-stroke engine, for example, the fundamental basis cycle of the engine may correspond to a 720 degree cycle in which each 720 degree cycle corresponds to two rotations of the engine crankshaft. While analysis of a four-stroke engine is described in detail herein, it will be appreciated that the inventive concepts described herein are not limited to analysis of four-stroke engines.

The times at which the engine duration is estimated may be spaced evenly throughout the signal. "Duration" is related to engine speed in revolutions per minute (RPM) as follows. As each 720 degree cycle in a four-stroke engine corresponds to two rotations of the engine crankshaft, the engine speed, in RPM, of a four-stroke engine can be expressed as shown in Equation (1).

$$\text{Speed(in RPM)}=120/\text{Duration(in seconds)} \quad (1)$$

Thus, for example, an engine having a 720-degree cycle duration of 0.1 seconds is running at 1200 RPM.

In cycle length estimation, the operations first determine if the signal has a complicated spectrum (Block 204). If so, maximum adjacent correlation is performed on the signal 130 as discussed below relative to Block 208. Otherwise, if the signal does not have a complicated spectrum, correlation analysis is performed on portions of the signal as discussed below (Block 206).

Figure 5A:
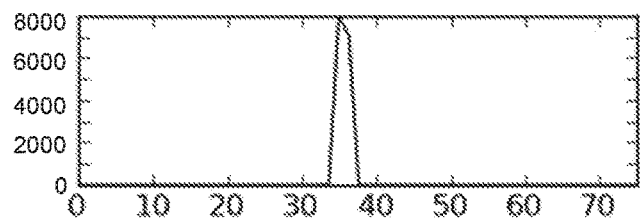
FIGS. 5A-5D illustrate frequency spectra of various signals.
Figure 5B:
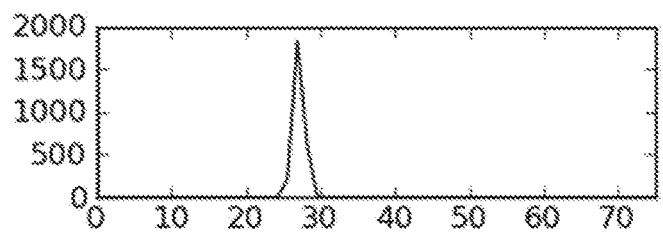
Figure 5C:
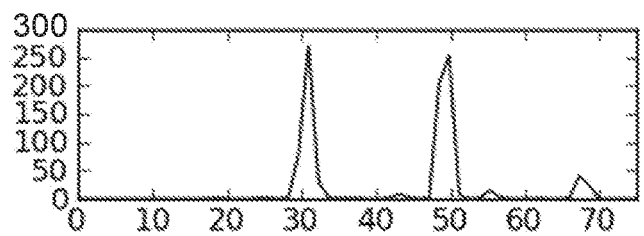
Figure 5D:
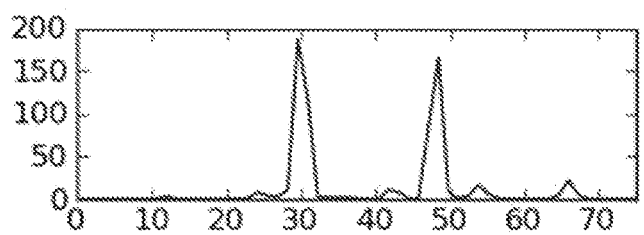

The complexity of the frequency spectrum of the signal is analyzed (Block 204). The frequency spectra of a signal may be obtained by taking a 1024-point Discrete Fourier Transform (DFT) of the signal 130, although other DFT window sizes could be used. It will be appreciated that when a $2^N$-point DFT is being calculated wherein N is an integer, a computationally efficient Fast Fourier Transform (FFT) algorithm could be used for the calculation. FIGS. 5A-5D illustrate frequency spectra of various signals 30. FIGS. 5A and 5B show simple DFTs having a single peak in the frequency spectrum, while FIGS. 5C and 5D show more complicated DFTs including multiple peaks in the frequency spectrum.

The basic concept is that "simple" frequency spectra have single dominant peaks while the "complicated" frequency spectra have multiple dominant peaks. When a spectrum is complicated, the fundamental frequency can be ambiguous, and therefore harder to identify when attempting to track variations in the fundamental frequency.

In general, signals obtained from engines with 5 or fewer cylinders may be considered "simple". However, in some cases, 6-cylinder engines can produce a "simple" signal (i.e., a signal having a "simple" frequency spectrum).

Correlation refers to a mathematical operation that compares one signal with another. In particular, correlation is a measure of how similar two signals (e.g. f[k] and g[k]) are when they are offset from each other by a given shift n. Mathematically, correlation of discrete signals f[k] and g[k] is defined as:

$$(f \otimes g)[n] = \sum_{m=-\infty}^{\infty} f[m]g[n+m] \quad (2)$$

In a correlation operation, the signals are repeatedly shifted and multiplied together. At each shift n, the signals are multiplied together on a sample by sample basis, and the results are summed. Thus, correlation of two signals produces a sequence of numbers that indicate how similar the signals are over a range of shift values. The peak of the correlation sequence indicates the shift value at which the signals are most similar.

FIGS. 6A to 6D illustrate correlation results and alignment of portions of the signals corresponding to FIGS. 5A to 5D, respectively, based on the correlation results. In particular, FIGS. 6A(1) to 6D(1) illustrate RPM variation over a 10-second interval. The graphs of FIGS. 6A(2) and 6B(2) illustrate portions of simple filtered engine signals that were aligned using auto correlation, while the graphs of FIGS. 6C(2) and 6D(2) illustrate portions of complex filtered engine signals that were aligned using maximum adjacent correlation.

Figure 6A:
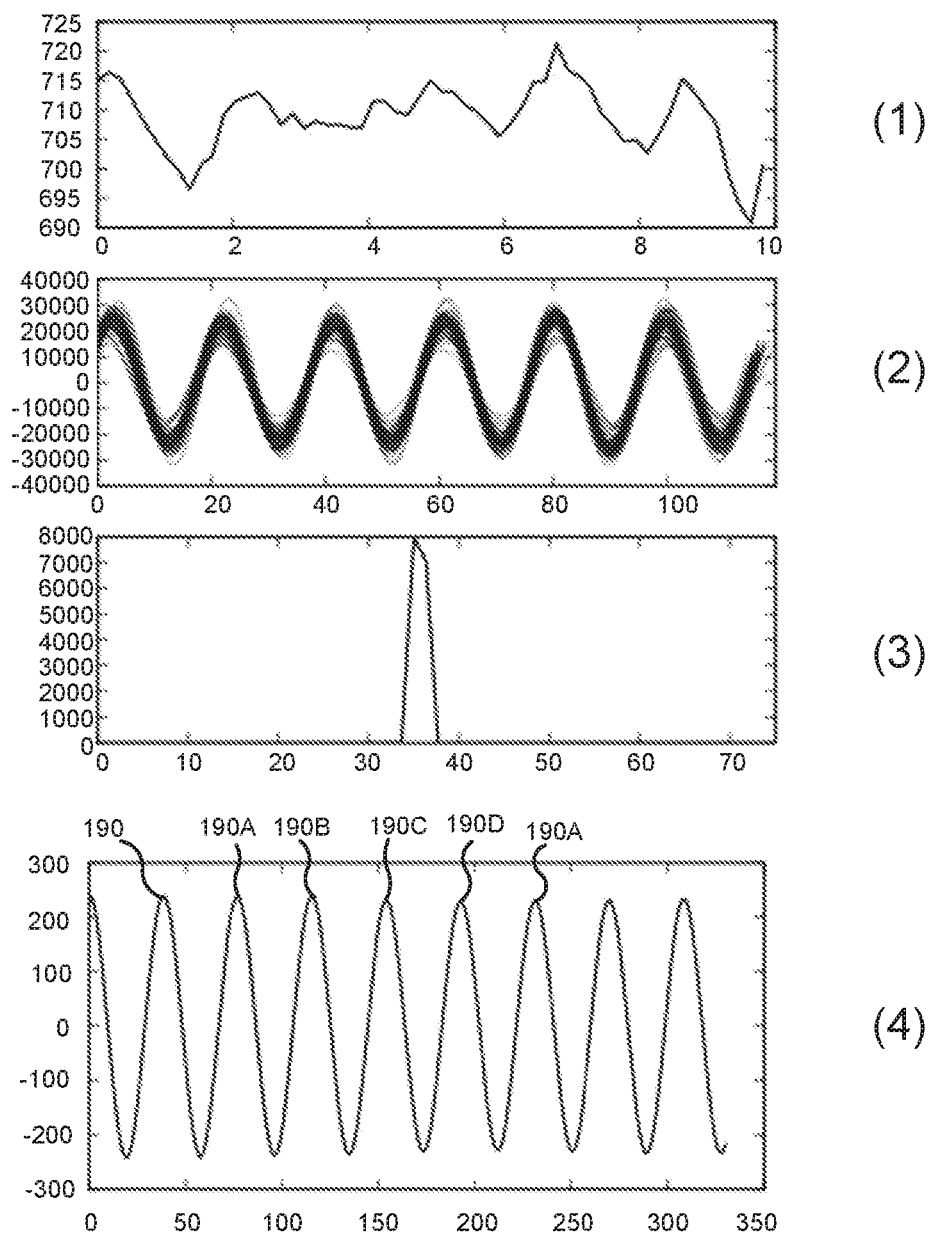
FIGS. 6A to 6D illustrate correlation results and alignment of portions of the signals corresponding to FIGS. 5A to 5D, respectively.
Figure 6B:
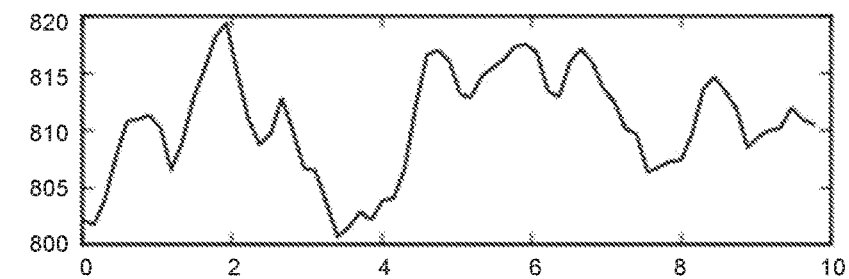
Figure 6B:
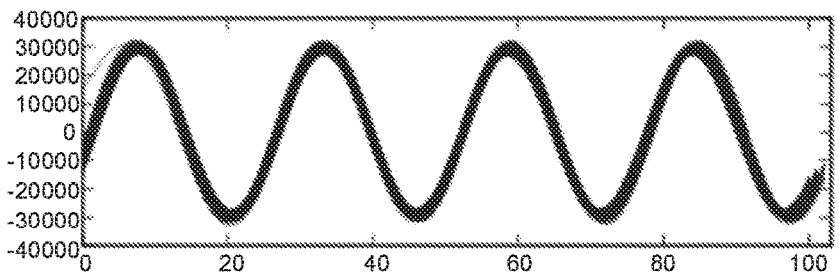
Figure 6B:
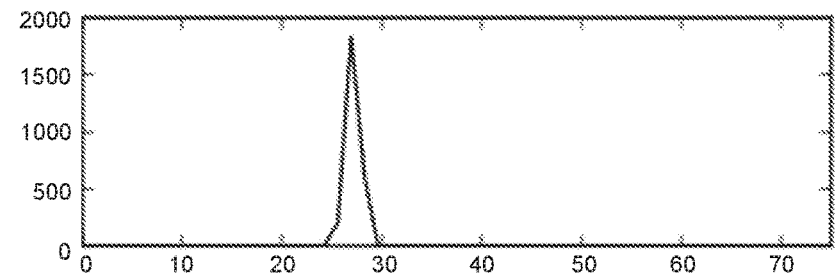
Figure 6B:
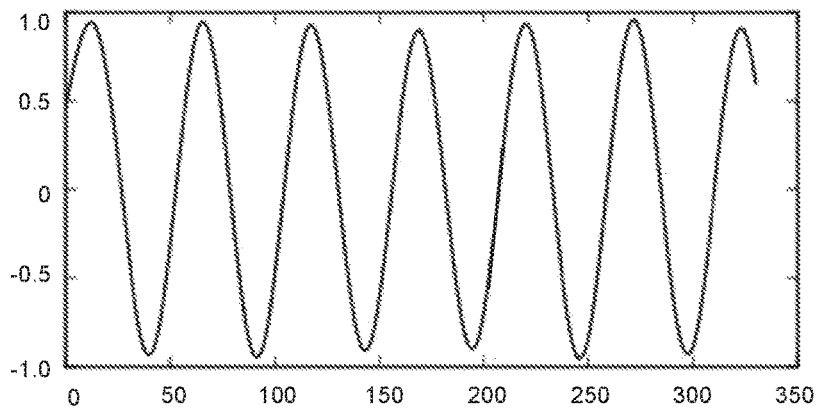
Figure 6C:
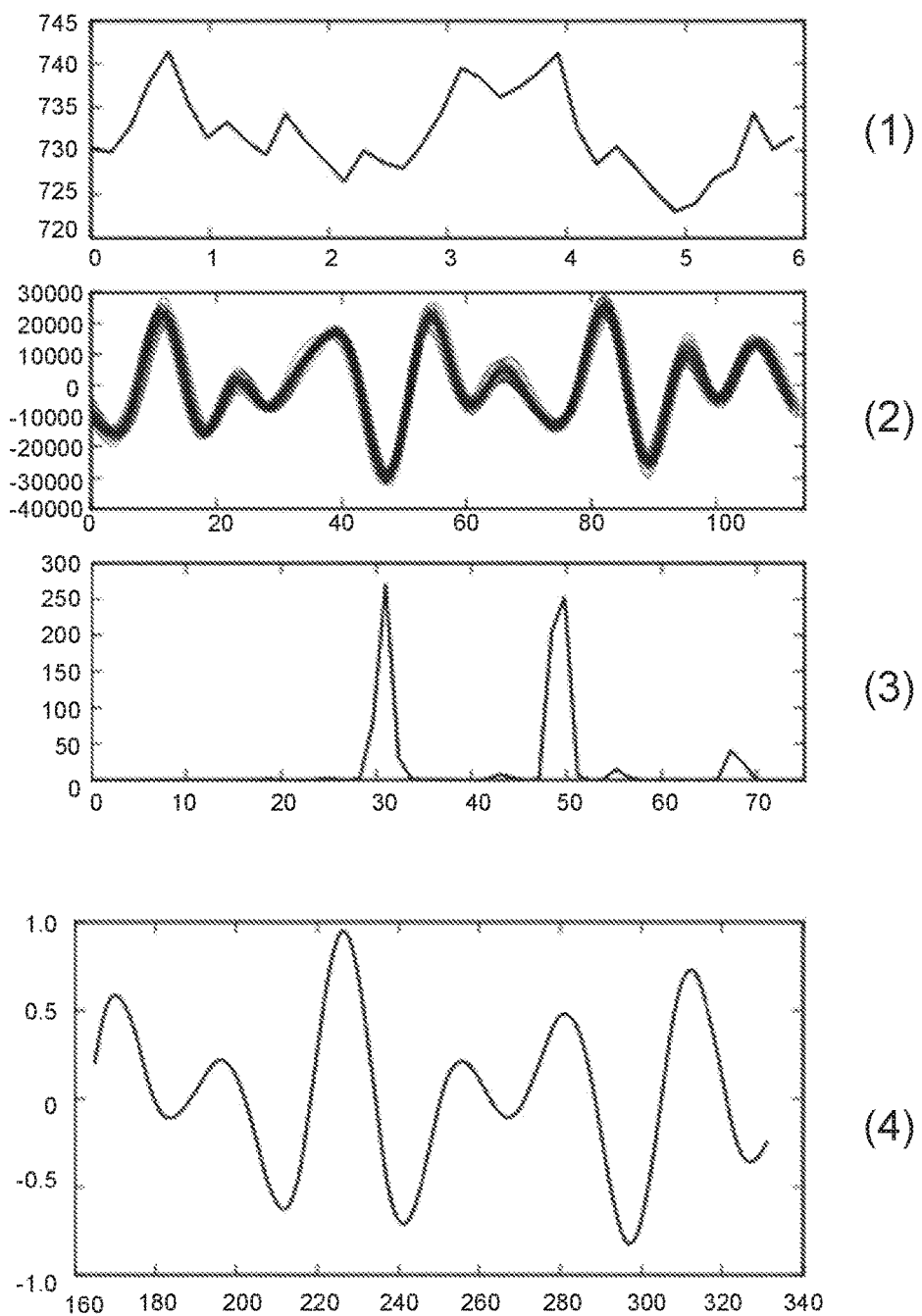
Figure 6D:
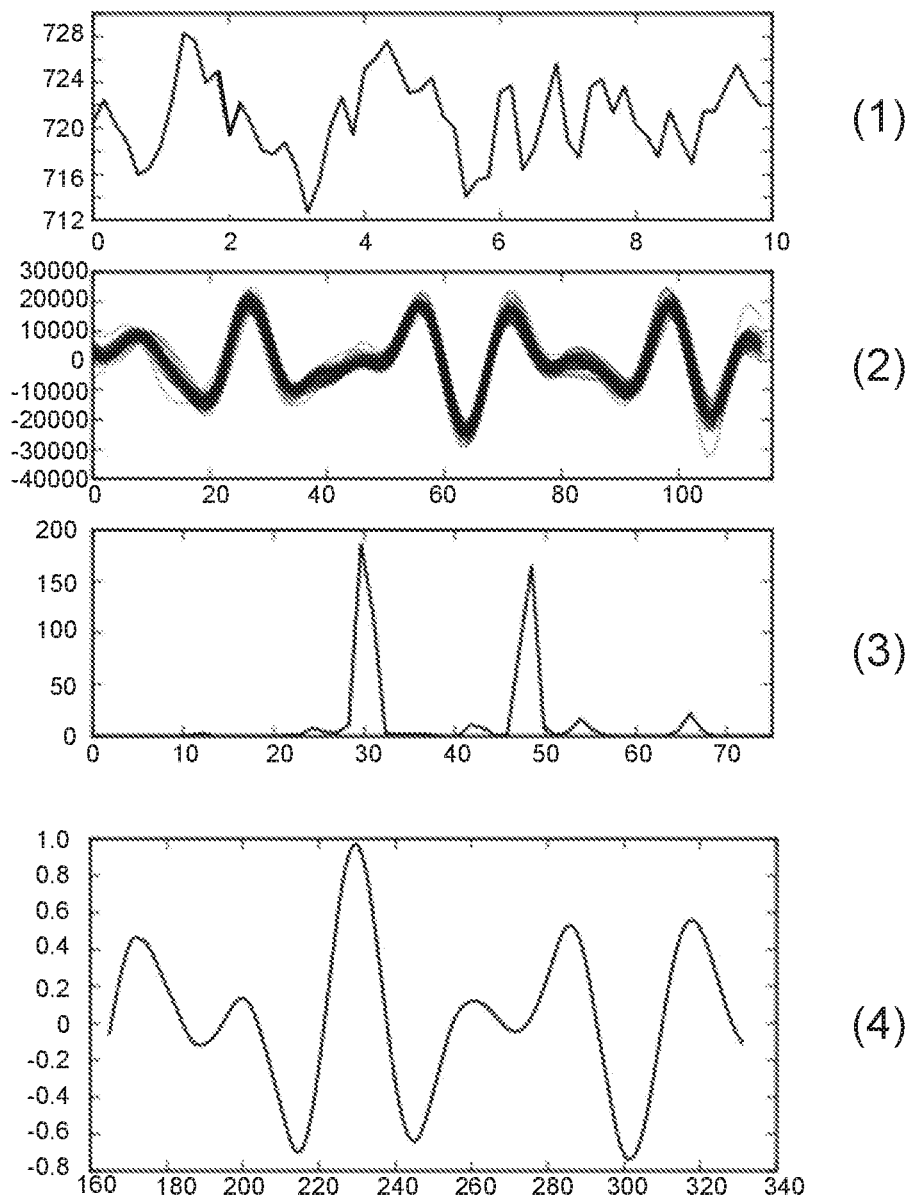

FIGS. 6A(3) to 6D(3) illustrate frequency spectra of the filtered engine signals. FIGS. 6A(4) and 6B(4) illustrate reduced sample rate autocorrelation results, while FIGS. 6C(4) and 6D(4) illustrate results of reduced sample rate maximum adjacent correlation.

As will be appreciated, interpretation of the correlation results for "simple" engine signals may be relatively straightforward, while the correlation results from "complicated" signals may be more difficult to interpret.

In particular, FIG. 6A(4) shows a repeating pattern of correlation peaks 190 spaced at regular intervals.

In particular, correlation results for "simple" signals may have local maxima at time points when the signal shows more similarity to earlier versions of itself. The repetitive nature of the engine's signal produces regular peaks in the correlation results that show where it repeats.

The duration is determined to be a multiple of the distance between the correlation peaks (e.g., the cycle duration is determined based on the number of samples from the first correlation peak 190A to the next correlation peak 190A).

Accordingly, for a "simple" signal, the engine speed at a particular portion of the signal 130 can be measured directly from the correlation results at that particular portion of the signal 130.

Processing of "Simple Signals"

According to some embodiments, the duration of an engine cycle can be determined in one of two ways depending on whether or not the signal 130 has a complicated frequency spectrum. For signals having simple frequency spectra, a correlation is performed and the correlation results are analyzed. A number of peaks in the correlation output corresponding to the number of cylinders of the engine is counted.

In particular, estimation of the engine cycle length, or duration, may be done using an auto-correlation analysis of portions of the signal sample at selected time points. This means that a section of the signal is correlated with a time shifted version of itself (or another section of the signal).

Figure 7A:
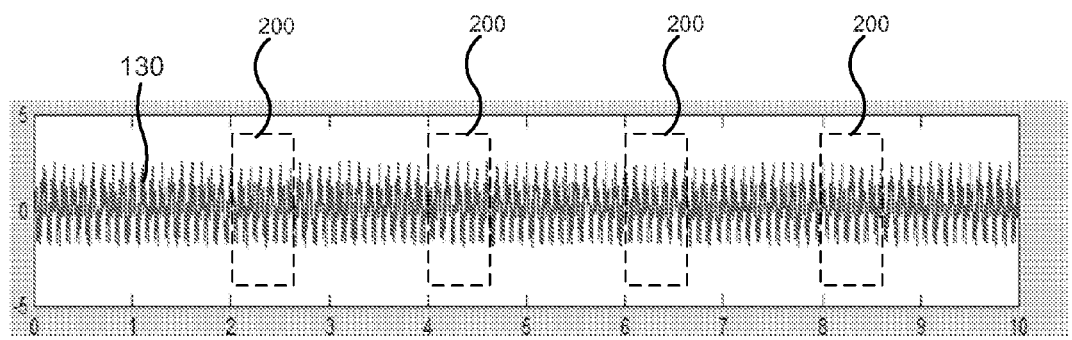
FIGS. 7A and 7B illustrate processing of "simple" signals in accordance with some embodiments.
Figure 7B:
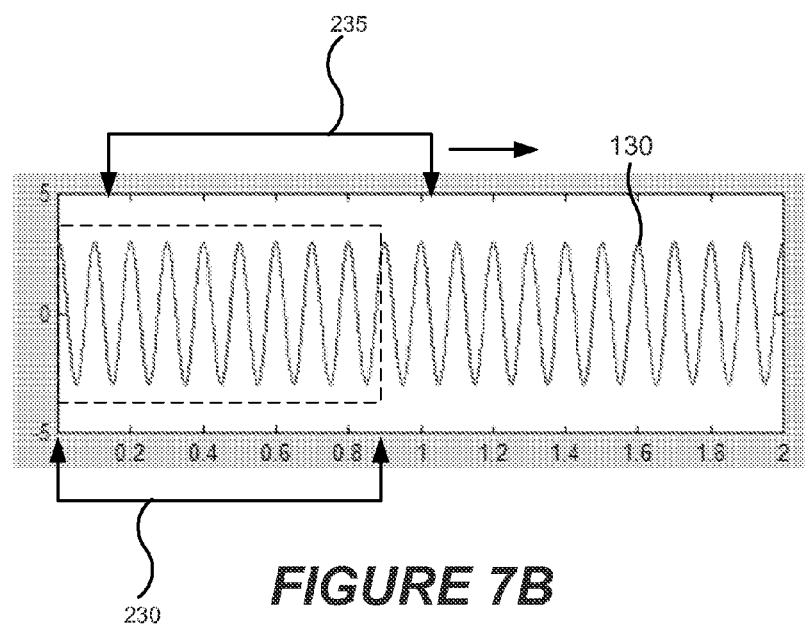

Processing of "simple" signals is illustrated in FIGS. 7A and 7B. The X- and Y-axis scales shown in FIGS. 7A and 7B are arbitrary.

Referring to FIG. 7A, sections 200 of the signal 130 are chosen for correlation analysis at various locations in the signal sample. These sections 200 may be referred to as correlation windows. The length of the sections 200 may be chosen to be large enough to include at least several engine cycle durations. For example, for a four cylinder engine, the correlation window may have a length of 0.6 seconds.

Referring to FIG. 7B, a fixed reference window 230 is established at the start of each section. A sliding correlation window 235 is defined relative to the fixed reference window 230. The portion of the signal 130 in the sliding window 235 is correlated with the portion of the signal in the sliding window, and the correlation results are analyzed. The sliding window is advanced to start at the next sample, and the correlation is again performed until sufficient cylinder peaks are counted in the correlation output. The speed of the engine can then be taken from the correlation output results as described above with respect to FIG. 6A.

In other embodiments, for simple signals, the portion of the signal in the reference window 230 may simply be correlated with itself, and the correlation results analyzed as described above with respect to FIG. 6A(4).

In still other embodiments, the portion of the signal in the reference window 230 may be analyzed to identify repetitive features, such as zero crossings with positive slope, zero crossings with negative slope, etc. The zero crossings may be used to align adjacent cycles, and the last cycle length may be used to predict the next cycle length and then use the zero (or other constant) to fine tune the next one.

Processing of "Complicated" Signals

For engines with complicated frequency spectra, (e.g., engines with 6 or more cylinders), a single DFT, such as a 1024-point Hamming-windowed FFT, is taken from the middle of each ten-second segment (at the reduced sample rate of 1378.125 Hz, equivalent to approximately one second worth of signal).

In the eight cylinder case, the spectrum for a ten-second segment is considered "complicated" if it has at least two peaks above the minimum threshold (for example, 0.0625*maximum FFT magnitude). In the six cylinder case, a spectrum is considered complicated if it has at least four strong peaks (at 0.03125*maximum FFT magnitude), OR if it has at least two strong peaks, but at least one of the peaks is very strong (0.5*maximum FFT magnitude), and outside the min/max RPM range for a six cylinder. In addition, a noise reduction step may be applied between the FFT and the peak detection, which amounts to a frequency domain cyclic autocorrelation (i.e. conjugate multiplication of the spectrum). Note this is completely unrelated to the primary [moving] correlation analysis that is performed in the time domain for signals with simple spectra, although it is used for a similar reason.

For signals having more complicated spectra (as indicated by the presence of multiple peaks in the FFT output), a maximum adjacent correlation method (Block 208) may be used.

Figure 8A:
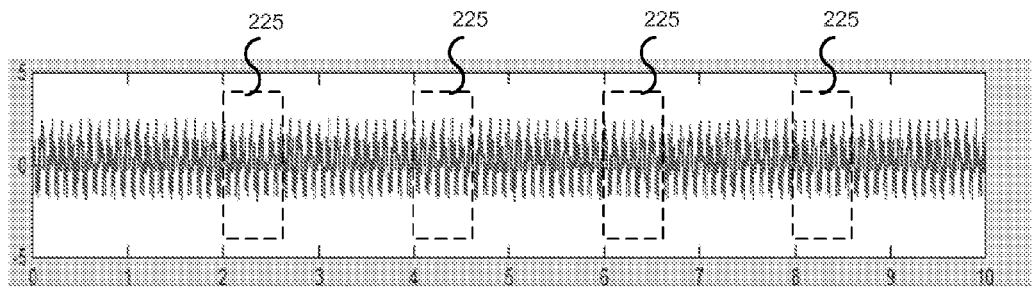
FIGS. 8A to 8C are graphs illustrating maximum adjacent correlation in accordance with some embodiments.
Figure 8B:
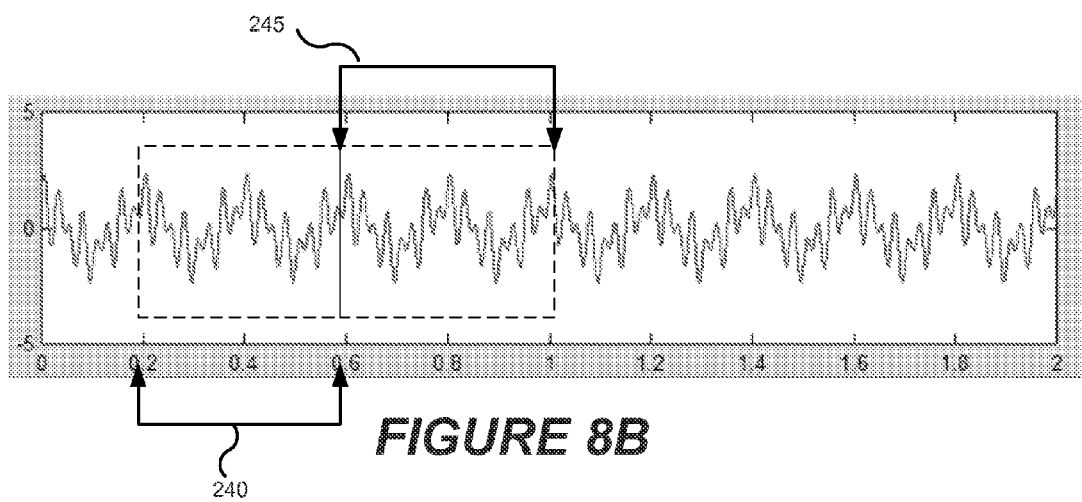
Figure 8C:
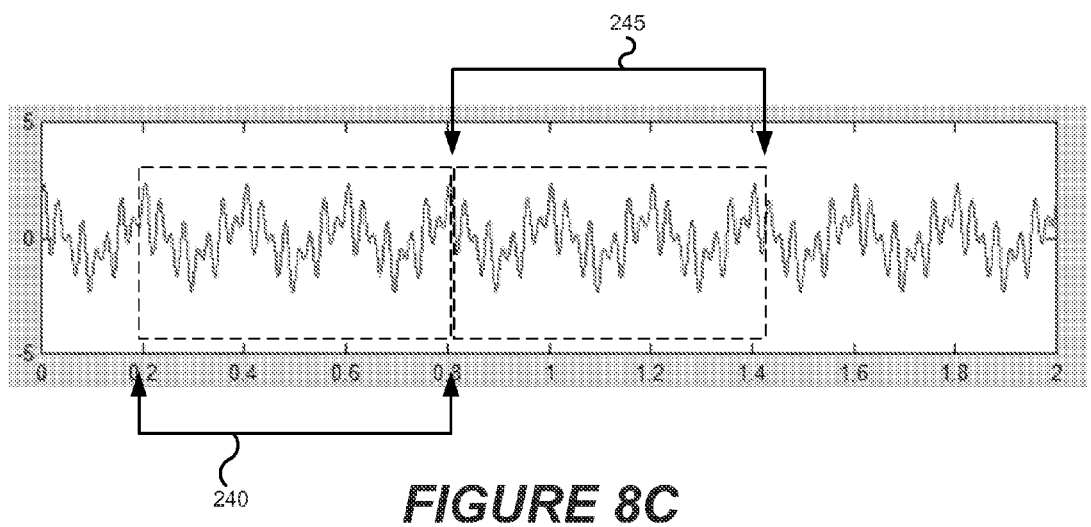

Maximum adjacent correlation is illustrated in FIGS. 8A to 8C. The X- and Y-axis scales shown in FIGS. 8A-8C are arbitrary.

Referring to FIG. 8A, similar to the "simple" case, sections 225 of the signal are chosen for correlation analysis at various locations in the signal sample. A minimum expected duration (corresponding to a maximum RPM) and a maximum expected duration (corresponding to a minimum RPM) are estimated.

Referring to FIG. 8B, at each section 225, a first correlation window 230 is defined. The first correlation window 230 has a length equal to the minimum expected duration. A second correlation window 235 is defined adjacent the first correlation window 230, and has the same length as the first correlation window 230.

The portion of the signal 130 in the first correlation window 240 is correlated with the portion of the signal 130 in the second correlation window 245.

The first and second correlation windows 240, 245 are then increased by one sample each, and the correlation is performed again. This process is repeated until the first and second correlation windows have reached their maximum length, corresponding to the minimum expected RPM, as shown in FIG. 8C.

The duration is assumed to be equal to the length of the correlation windows 240, 245 at which the correlation output is maximized.

To speed processing of this step, the following can be done: a. At a lower sample rate, the algorithm estimates the length of engine cycles using the above technique for time periods spaced (evenly, randomly or otherwise chosen) throughout the signal. b. RPM estimates that would not be likely due to unrealistic accelerations are discarded. In other words, RPMs that change "too fast" are removed. c. The remaining RPMs are curve fit to create an initial guess of how RPM varies over time using a spline, linear or other fit. d. Using the full sample rate and the estimated RPM trace as a starting point, the RPM prediction is optimized over time by looking for the nearest auto-correlation or maximum adjacent correlation maximum corresponding to the guessed RPM and using that maximum to derive the predicted RPM at full sample rate.

Figure 9:
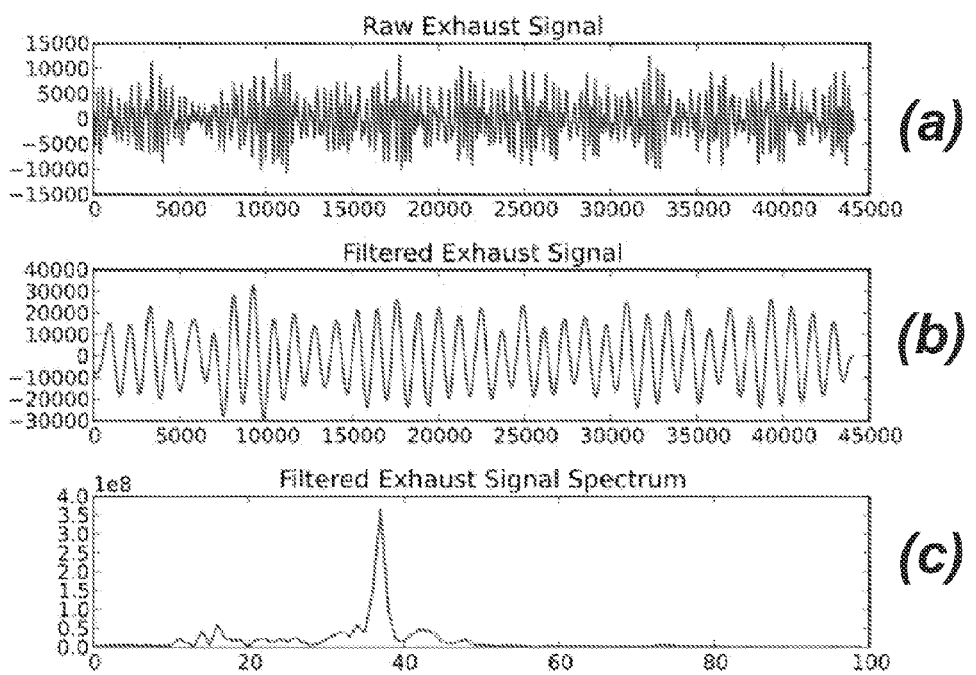
FIGS. 9-10 illustrate analysis of an engine signal from a six cylinder engine having a simple spectrum in accordance with some embodiments.
Figure 10:
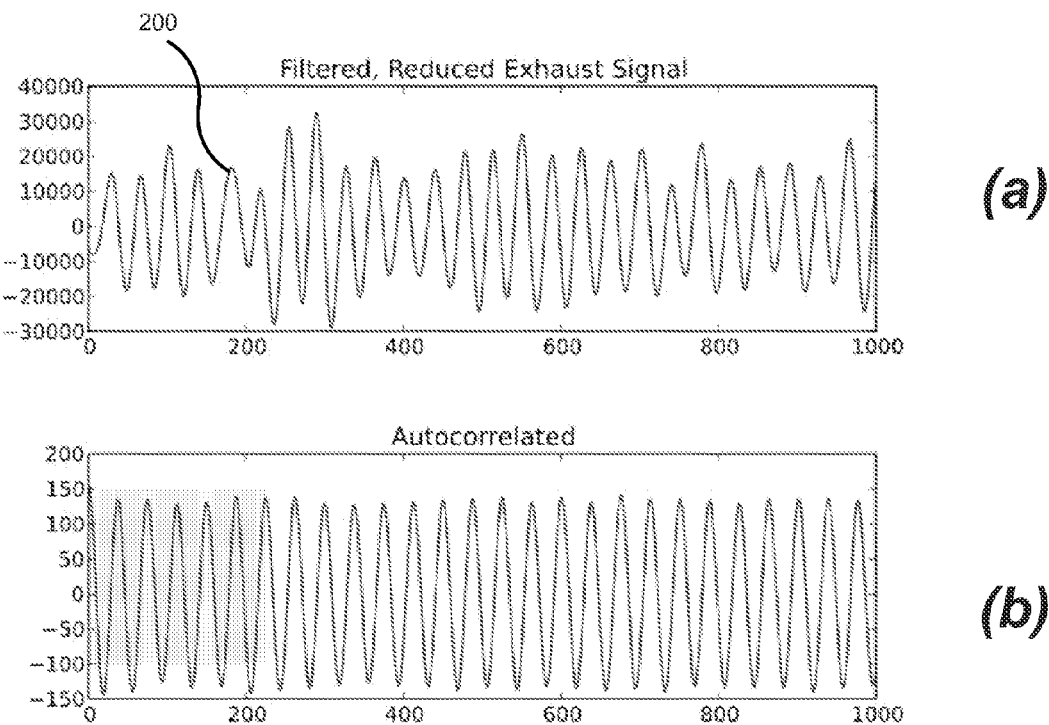
Figure 11:
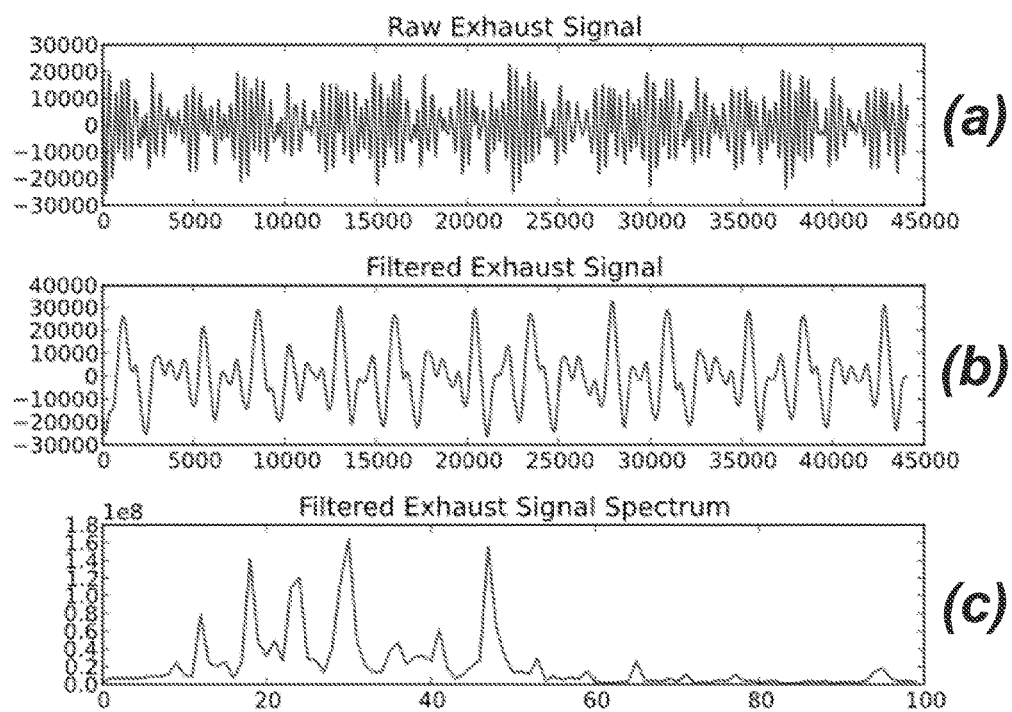
FIGS. 11-12 illustrate analysis of an engine signal from an eight cylinder engine having a complicated spectrum in accordance with some embodiments.
Figure 12:
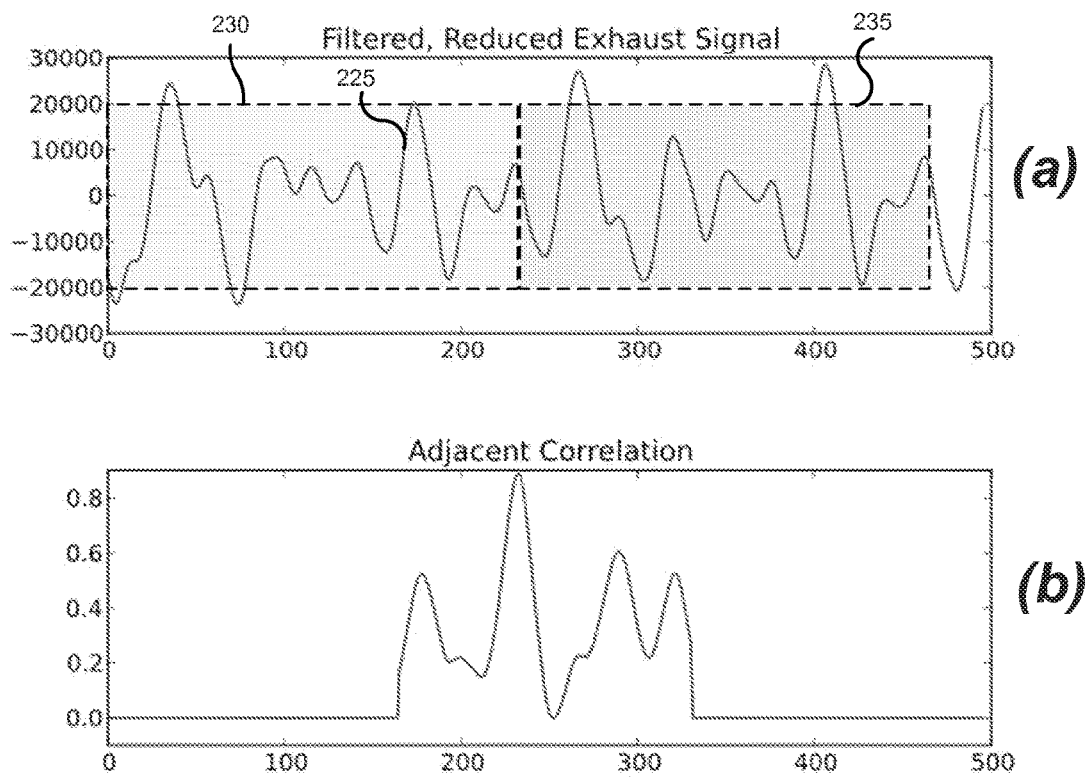
Figure 13A:
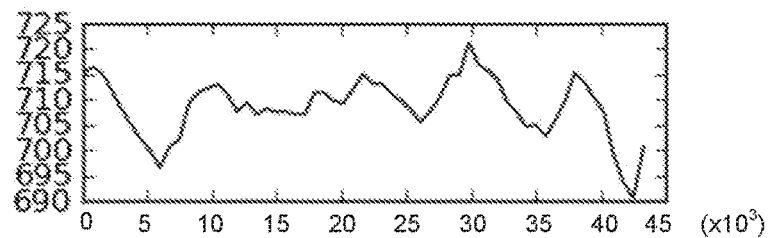
FIGS. 13A to 13D illustrate graphs of engine speed in RPM versus time corresponding to FIGS. 5A-5D, respectively.
Figure 13B:
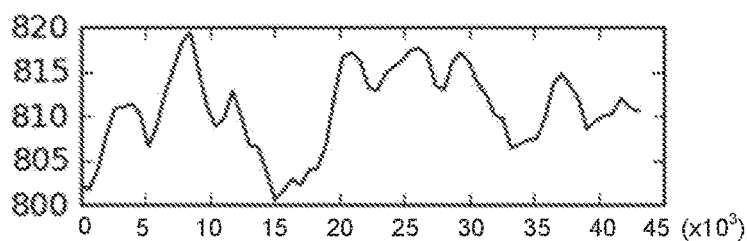
Figure 13C:
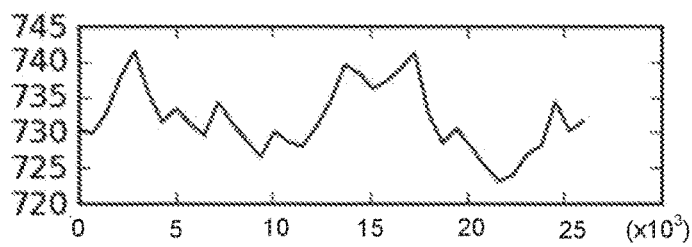
Figure 13D:
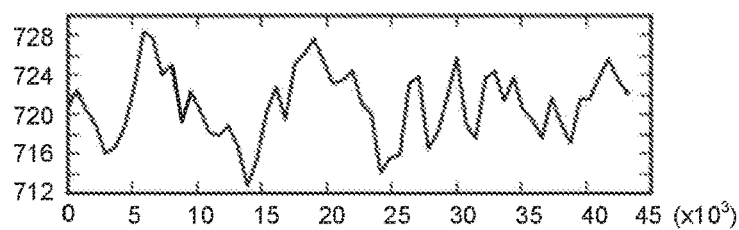

FIGS. 9-10 illustrate analysis of an engine signal from a six cylinder engine having a simple spectrum, while FIGS. 11-12 illustrate analysis of an engine signal from an eight cylinder engine having a complicated spectrum.

In particular, FIG. 9(a) is a graph of a raw acoustic signal measured at the exhaust of a vehicle. FIG. 9(b) illustrates a low pass filtered version of the exhaust signal, while FIG. 9(c) illustrates the relatively simple frequency spectrum of the filtered signal.

FIG. 10(a) illustrates a segment 200 of the filtered signal, while FIG. 10(b) illustrates autocorrelation results obtained by autocorrelating the segment 200 (i.e., correlating it with itself). The autocorrelation results show clear autocorrelation peaks from which the duration of the engine signal can be determined as discussed above.

FIG. 11(a) is a graph of a raw acoustic signal measured at the exhaust of a vehicle having an eight-cylinder engine. FIG. 11(b) illustrates a low pass filtered version of the exhaust signal, while FIG. 11(c) illustrates the relatively complicated frequency spectrum of the filtered signal.

FIG. 12(a) illustrates a segment 225 of the filtered signal including adjacent correlation windows 230, 235, while FIG. 12(b) illustrates correlation results obtained by correlating the portion of the signal in the first correlation window 230 with the portion of the signal in the second correlation window 235.

FIGS. 13A-13D illustrate graphs of engine speed in RPM versus time corresponding to FIGS. 5A-5D, respectively.

Referring again to FIG. 3, once a set of data points corresponding to estimated RPMs at each selected segment of the signal 130 have been obtained, outlying data points in the correlation results may be eliminated (Block 210). In particular, assuming that the engine is idling at near-constant RPM, an iterative outlier analysis is applied to remove duration length estimates that are more than two standard deviations away from the mean of the remaining estimates. The remaining duration lengths are assumed to be representative of the true engine idle RPM.

Next, the duration lengths between the remaining duration length estimates are interpolated (Block 212) to produce an estimated duration length trace for the time-span of the recording. In some embodiments, the algorithm takes the estimated duration length trace and computes and subtracts a drift trace to account for RPM drift caused by engine warming.

The cycle length estimates may then be refined (Block 214). In some embodiments, the algorithm then starts back at the beginning of the recording and attempts to identify each engine duration explicitly by aligning the signal sections from adjacent durations. The starting point for the first duration is chosen to be the lowest point in the first half second of the recording. The starting point of the next duration is determined by: 1. First, looking up the duration length of the previous duration in the estimated duration length trace, 2. Then, shifting the start time of the next duration either earlier or later by the number of samples that maximizes the correlation of the adjacent segments. 3. When determining the length of the third and subsequent durations, the maximal auto-correlation shifted start time for each duration is determined by selecting the shift that maximizes the auto-correlation to any of the previous N durations (e.g., N=5). This step may be important for the robustness of the algorithm, since the presence of a misfire can cause adjacent durations to be very dissimilar.

The alignment process continues until the end of the recording is reached. The final, partial duration is discarded.

A further refinement may be to discard "outlier" engine speed estimates (e.g., estimates that are more than two standard deviations from mean) and then interpolate the remaining engine speed estimates. Such a refinement may enable these systems/methods to make sense of very noisy signals Finally the engine is diagnosed by looking for characteristic patterns in RPM variation over time based on the computed cycle durations. For instance, a misfire may be characterized by a sudden drop in RPM followed by a recovery. The severity of each misfire can be characterized by the size of the RPM drop. The results are scored (Block 216) indicating predicted misfires.

In some cases, the shape of the signal can be analyzed to identify characteristic patterns or misfire activity. For example, any departure from the regular pattern of a non misfiring signal, such as when a regular peak or valley in the signal is greater or smaller than usual, may indicate the occurrence of a misfire.

Some embodiments of the invention can be totally non-invasive to the vehicle. Embodiments of the invention may be implemented in many different ways, as there are many difference sources of signals that can be used.

Moreover, the measurements used in connection with embodiments of the invention may be very easy to perform.

Some individual sub-components of the engine and vehicle ("Other" motors, e.g., fuel injectors, spark plugs, ignition coils, valves, etc) also have a fixed and repeating constant electro mechanical motion that can also be diagnostically analyzed with the techniques of the invention.

Some embodiments may further provide methods of measuring crankshaft angular acceleration without the need for using sensors and processors built directly in to the vehicle itself.

Figure 14:
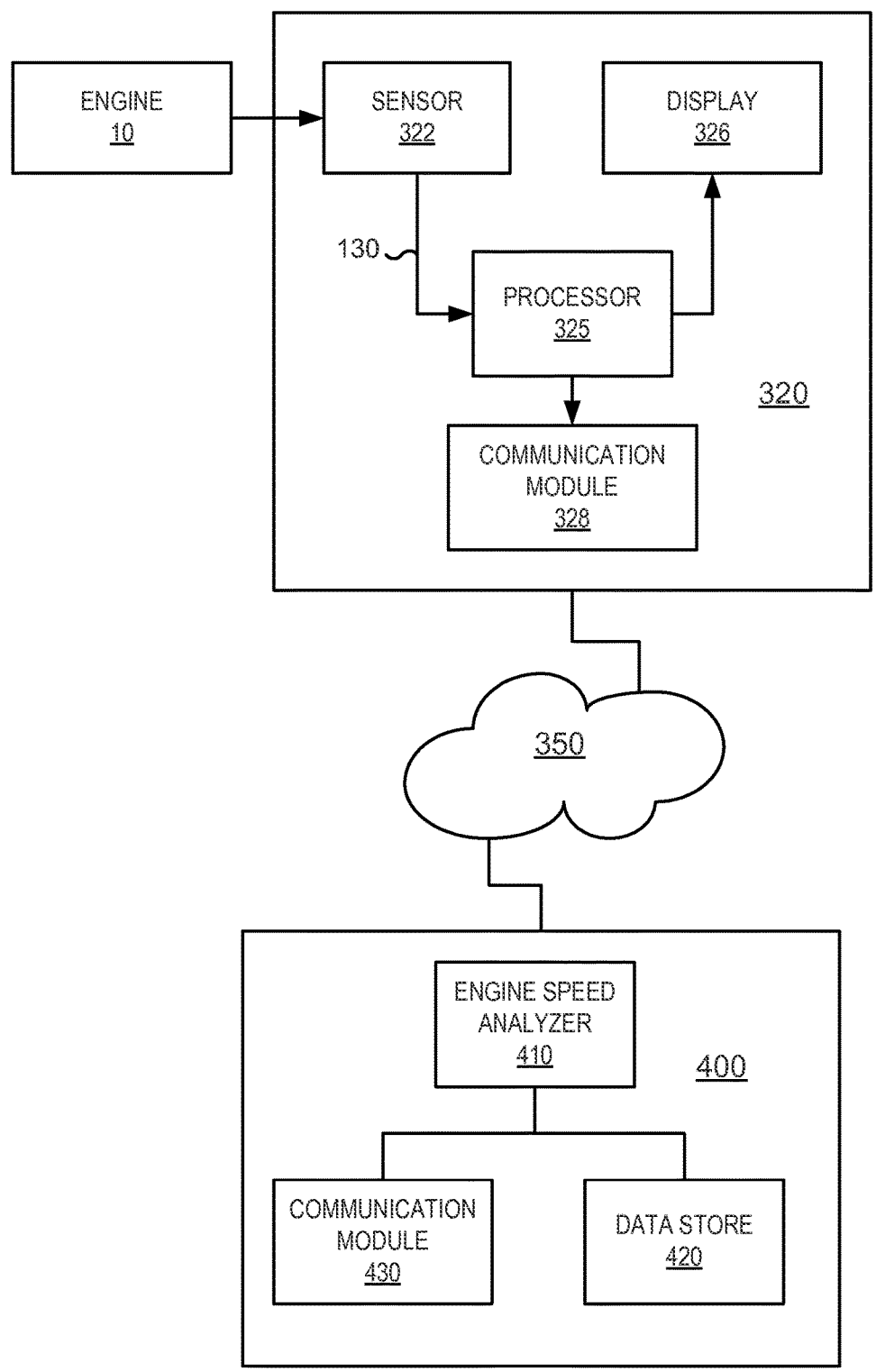
FIG. 14 is a block diagram illustrating systems for remote engine analysis in accordance with some embodiments.

Further embodiments of the invention are illustrated in FIG. 14, which is a block diagram of systems/methods for remote engine analysis. As shown therein, a test unit 320 includes a sensor 322 that senses a signal 130 associated with an engine 10, including an electronic signal or a non-electronic signal, such as an audible signal, a vibration signal, an electromagnetic signal, etc. The sensor 322 can include a transducer that generates an electronic signal in response to an audible signal associated with the engine 10. When the signal 130 includes an analog signal, the processor 325 may sample the signal 130 to convert the signal 130 into a digital signal.

The test unit 320 further includes a processor 325, a display 326 and a communication module 328. The communication module is configured to enable the test unit 320 to communicate with a remote server 400 over a communication interface 350, which can include a public communication network, such as the Internet, a private communication network such as a privately operated Ethernet, a direct point-to-point communication interface, etc. Accordingly, the communication module 328 may be configured to communicate using a data communication protocol, such as TCP/IP, over a wired or wireless communication interface.

The signal 130 is provided by the sensor 322 to the processor 325, which transmits the signal 130 using the communication module 228 over the communication interface 350 to the remote server 400. The test unit 320 may send the signal 130 to the remote server 400 as raw signal data. In some embodiments, the test unit 320 may process the signal data prior to transmitting the data to the remote server. For example, the test unit 320 may truncate the signal to a predetermined number of samples, may filter the data, may compress the data and/or may perform other data processing operations on the signal prior to transmission of the signal to the remote server 400.

The remote server 400 includes an analyzer 410, a communications module 430 and a data store 420. The communications module 430 is configured to enable the remote server 400 to communicate with the test unit 220 over the communication interface 300. In particular, communications module 430 receives the data signal 130 from the test unit 220 and provides the data signal 130 to the analyzer 410 for analysis using the techniques described herein. The communication module 430 also transmits a signal from the analyzer 410 to the test unit 220 indicative of the results of the analysis of the data signal 130.

The data store 420, which may include one or more local or remotely accessed databases, may contain information used by the analyzer 410 to analyze the signal.

The engine speed analyzer 410 analyzes the electronic signal 130. From this analysis, the engine speed analyzer 410 may identify the occurrence of a misfire condition in the engine 10 as described in detail above.

Figure 15:
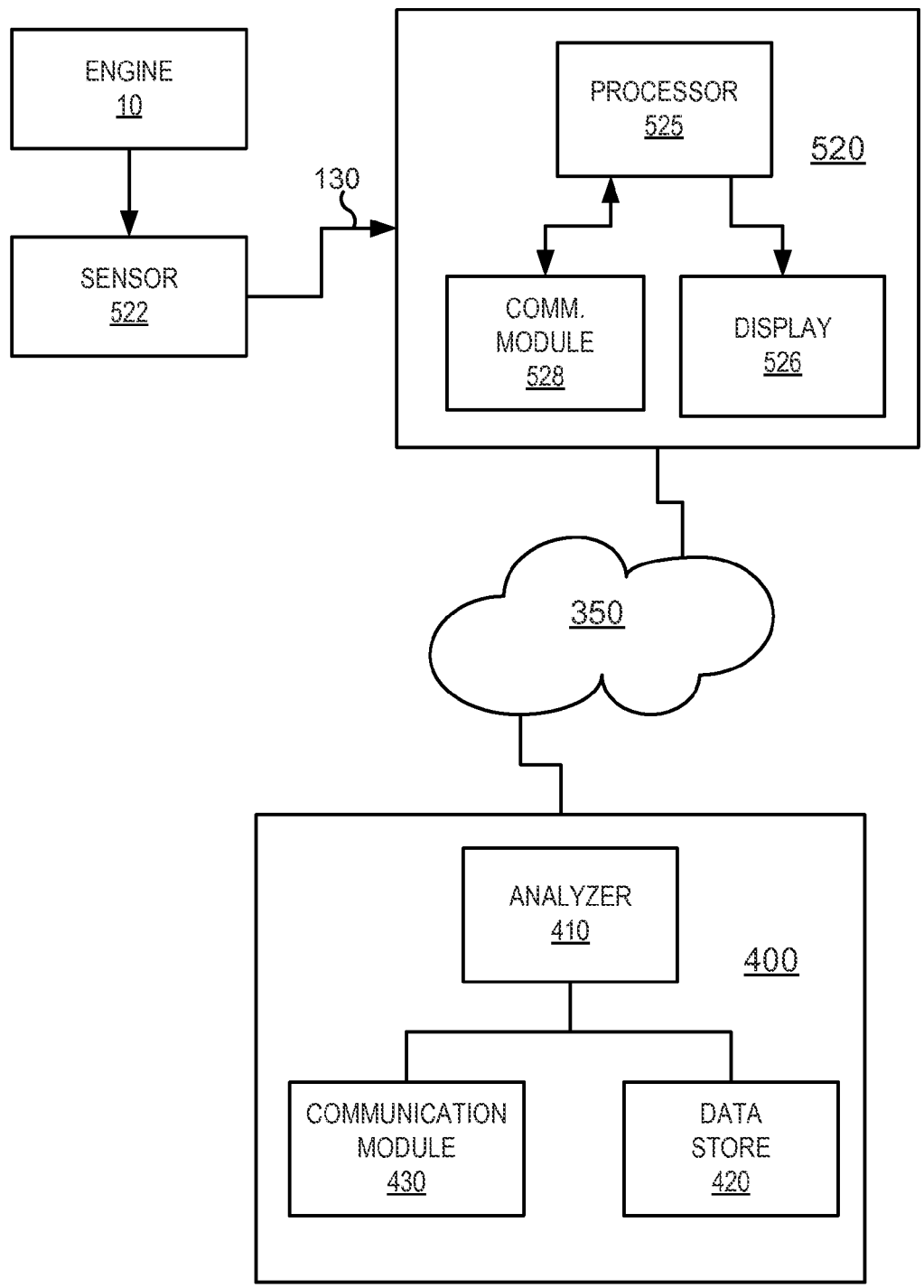
FIG. 15 is a block diagram illustrating systems for remote engine analysis in accordance with further embodiments.

Further embodiments of the invention are illustrated in FIG. 15. As shown therein, a sensor 522 may be provided that is separate from a test unit 520. The sensor 522, which may include for example an acoustic transducer, may provide a data signal 130 derived from an engine 10 to a test unit 520, which includes a processor 525, a communications module 528 and a display 526. The processor 525, communications module 528 and display 526 are similar in function to the processor 225, communication module 228 and display 226 shown in FIG. 14.

In some embodiments, the test unit 520 may include a handheld computer, a laptop computer, a smartphone, a tablet computer, a desktop computer or any other general purpose computing device that is configured to receive a data signal 130 generated by the sensor 522 and transmit the signal to a remote server 400. When the signal 130 received by the test unit 520 is an analog signal, the test unit 520 may sample the signal to form a digital signal. The digital signal is transmitted by the test unit 520 over a communication interface 300 to a remote server 400 that analyzes the signal as discussed above.

As will be appreciated by one of skill in the art, the present invention may be embodied as a method, data processing system, and/or computer program product. Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments of the present invention are described herein with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in an object oriented programming language such as Java® or C++. However, the computer program code for carrying out operations of the present invention may also be written in conventional procedural programming languages, such as the "C" programming language, functional programming languages, or other programming languages. The program code may execute entirely on the user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and sub combinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. A method performed by at least one processor of a computer system of analyzing a cyclo-mechanical engine, comprising:
   detecting, via a sensor, an engine signal associated with a plurality of cycles of the cyclo-mechanical engine;
   determining a complexity of the engine signal;
   selecting an operation based on the complexity of the engine signal;
   performing the operation by comparing a first sample of the engine signal with a second sample of the engine signal to determine a cycle length of the cyclo-mechanical engine;
   analyzing the engine signal;
   detecting a variation in the cycle length of the cyclo-mechanical engine over time based on the cycle length based on the analyzing of the engine signal;
   determining whether the variation in the cycle length is outside of a threshold; and
   outputting a signal indicating an abnormal condition of the cyclo-mechanical engine responsive to the variation in the cycle length being outside of the threshold.

2. The method of claim 1, wherein the operation comprises a correlation operation and wherein comparing the first sample of the engine signal with the second sample of the engine signal comprises correlating the first sample with the second sample.

3. The method of claim 1, wherein determining the complexity of the engine signal comprises:
   generating a frequency spectrum of the engine signal; and
   analyzing the frequency spectrum of the engine signal to determine if the frequency spectrum of the engine signal has a single dominant peak or multiple dominant peaks; and wherein selecting the operation based on the complexity of the engine signal comprises:
   in response to determining that the frequency spectrum has multiple dominant peaks, selecting a first correlation operation; and
   in response to determining that the frequency spectrum has a single dominant peak, selecting a second correlation operation that is different from the first correlation operation.

4. The method of claim 3, wherein the first correlation operation comprises maximum adjacent correlation.

5. The method of claim 4, wherein performing maximum adjacent correlation comprises:
   determining a minimum expected cycle length and a maximum expected cycle length;
   choosing a plurality of sections of the engine signal for analysis;
   defining a first correlation window at each section of the engine signal, the first correlation window having a length equal to the minimum expected cycle length;

defining a second correlation window at each section of the engine signal, the second correlation window having a length equal to the first correlation window;

correlating a portion of each section of the engine signal covered by the first correlation window with a portion of each section of the engine signal covered by the second correlation window;

repeating steps of:

(a) increasing sizes of the first correlation window and the second correlation window in each section of the engine signal; and (b) correlating the portion of each section of the engine signal covered by the first correlation window with the portion of each section of the engine signal covered by the second correlation window;

until the sizes of the first correlation window and the second correlation window are equal to the maximum expected cycle length.

6. The method of claim 5, further comprising:
identifying a correlation peak from results of the correlations.

7. The method of claim 1, further comprising:
sampling the engine signal at a first sampling rate, wherein the sampling of the engine signal at the first sampling rate comprises:
processing the engine signal at a second sampling rate that is lower than the first sampling rate to determine changes in engine speed over time;
analyzing a plurality of changes in engine speed to develop an estimate of engine speed variations over time; and
processing the engine signal at the first sampling rate to determine a variation in engine speed over time in response to the estimate of engine speed variations over time.

8. The method of claim 7, further comprising:
discarding a subset of the plurality of changes in engine speed, resulting in a discarded subset and a remaining subset, wherein each change in engine speed in the discarded subset occurs outside a predetermined range of engine speeds;
wherein analyzing changes in engine speed to develop the estimate of engine speed variations over time comprises analyzing the remaining subset.

9. The method of claim 1, wherein detecting the engine signal comprises detecting an acoustic signal associated with the cyclo-mechanical engine and converting the acoustic signal into an electrical signal.

10. The method of claim 9, wherein the acoustic signal comprises an exhaust signal.

11. The method of claim 1, wherein detecting the engine signal comprises at least one of detecting an electrical signal, an RF signal, a heat signal, an infrared signal, a vibration signal, an optical signal, an airflow signal, and/or a mass flow signal, associated with the cyclo-mechanical engine.

12. The method of claim 1, wherein detecting the engine signal comprises detecting an alternator output signal.

13. The method of claim 1, wherein the cyclo-mechanical engine comprises a four-stroke internal combustion engine or a two-stroke internal combustion engine, and wherein analyzing the engine signal comprises analyzing a cycle corresponding to a 720-degree rotation of a crankshaft in the cyclo-mechanical engine where the cyclo-mechanical engine comprises a four-stroke internal combustion engine or analyzing a cycle corresponding to a 360-degree rotation of a crankshaft in the cyclo-mechanical engine where the cyclo-mechanical engine comprises a two-stroke internal combustion engine.

14. The method of claim 1, wherein analyzing the engine signal to detect a variation in the cycle length of the cyclo-mechanical engine comprises generating a plurality of engine cycle length estimates, the method further comprising refining the engine cycle length estimates by aligning engine signal sections from adjacent durations.

15. The method of claim 14, wherein aligning engine signal sections from adjacent durations comprises:
choosing a starting point for a first cycle duration;
choosing a starting point for a second cycle duration adjacent the first cycle duration by starting with a duration length of the first cycle duration and shifting the second cycle duration by a number of samples that increases a correlation between the first duration cycle and the second cycle duration.

16. The method of claim 15, wherein determining lengths of third and subsequent cycle durations comprises shifting the first cycle duration and the second cycle duration by a number of samples that increases a correlation with any of a previous N number of cycle durations, where N>1.

17. A method of analyzing a cyclo-mechanical engine having a fundamental basis cycle length, the method comprising:
detecting an engine signal associated with a plurality of fundamental basis cycles of the cyclo-mechanical engine;
determining a complexity of the engine signal;
analyzing, based on the complexity, the engine signal;
detecting a variation in a cycle length of the fundamental basis cycle of the cyclo-mechanical engine;
determining whether the variation in the cycle length is outside of a threshold; and
outputting a signal indicating an abnormal condition of the cyclo-mechanical engine responsive to the variation in the cycle length being outside of a threshold.

18. The method of claim 17, wherein the cyclo-mechanical engine is an internal combustion engine having a 720 degree fundamental basis cycle.

19. The method of claim 1, further comprising:
receiving a cylinder timing signal from the cyclo-mechanical engine; and
comparing the cylinder timing signal with the engine signal to identify which of a plurality of cylinders in the cyclo-mechanical engine is misfiring.

20. The method of claim 19, wherein the cylinder timing signal comprises a spark plug signal, a signal output by a cam sensor, or a signal output by a crank sensor in the cyclo-mechanical engine.

21. A method of analyzing a cyclo-mechanical engine, comprising:
detecting, via a sensor, an engine signal associated with a plurality of cycles of the cyclo-mechanical engine;
determining a complexity of the engine signal;
analyzing the engine signal;
estimating cycle lengths of the cyclo-mechanical engine at a plurality of locations in the engine signal based on analyzing of the engine signal, wherein a first location and a second location of the plurality of locations are selected based on the complexity of the engine signal;
refining the cycle length estimates to generate refined cycle length estimates;
identifying cycle length variations in response to the refined cycle length estimates;

wherein refining the cycle length estimates comprises aligning engine signal sections from adjacent durations by choosing a starting point for a first duration, and choosing a starting point for a second duration adjacent the first duration by starting with a duration length of the first duration and shifting the second duration by a number of samples that increases a correlation between the first duration and the second duration;

determining whether a plurality of cycle length variations is outside of a threshold and outputting a signal indicating an abnormal condition of the cyclo-mechanical engine responsive to the plurality of the cycle length variations being outside of the threshold.

22. The method of claim 21, wherein determining lengths of third and subsequent durations comprises shifting the first duration and the second duration by a number of samples that increases a correlation with any of a previous N number of durations, where N>1.

23. The method of claim 1, further comprising:
identifying misfire activity of the cyclo-mechanical engine from the variation in the cycle length of the cyclo-mechanical engine over time; and
identifying a strength and/or composition of a chemical cleaner that is recommended to remediate the misfire activity for the cyclo-mechanical engine being analyzed.

24. A computer program product for analyzing a cyclo-mechanical engine comprising a tangible computer readable storage medium having computer readable program code embodied in the tangible computer readable storage medium, the computer readable program code comprising:
computer readable program code configured to detect, via a sensor, an engine signal associated with a plurality of cycles of the cyclo-mechanical engine;
computer readable program code configured to determine a complexity of the engine signal;
computer readable program code configured to select a correlation operation based on the complexity of the engine signal;
computer readable program code configured to compare a first sample of the engine signal with a second sample of the engine signal to determine a cycle length of the cyclo-mechanical engine, wherein the computer readable program code configured to compare a first sample of the engine signal with a second sample of the engine signal comprises computer readable program code configured to perform the correlation operation to correlate the first sample with the second sample;
computer readable program code configured to analyze the engine signal;
computer readable program code to detect a variation in the cycle length of the cyclo-mechanical engine over time based on the cycle length;
computer readable program code to determine whether the variation in the cycle length is outside of a threshold; and
computer readable program code configured to output a signal indicating an abnormal condition of the cyclo-mechanical engine responsive to the variation in the cycle length being outside of a threshold.

25. A system for analyzing a cyclo-mechanical engine, comprising:
a sensor configured to generate an engine signal associated with a plurality of cycles of the cyclo-mechanical engine; and an engine speed analyzer configured to:
determine a complexity of the engine signal;
select a correlation operation based on the complexity of the engine signal;
compare, via performance of the correlation operation, a first sample of the engine signal with a second sample of the engine signal to determine a cycle length of the cyclo-mechanical engine;
analyze the engine signal;
detect a variation in the cycle length of the cyclo-mechanical engine over time based on the cycle length based on the analyzing of the engine signal;
determine whether the variation in the cycle length is outside of a threshold; and
output a signal indicating an abnormal condition of the cyclo-mechanical engine responsive to the variation in the cycle length being outside of a threshold.

26. The system of claim 25, wherein the engine speed analyzer is configured to output engine speed variation data relating to engine speed variation of the cyclo-mechanical engine, the system further comprising a processor coupled to the engine speed analyzer and configured to determine a recommended engine service based on the engine speed variation data.

27. The system of claim 25, wherein the system further comprises a processor configured to identify a strength and/or composition of a chemical cleaner that is recommended to remediate misfire activity in the cyclo-mechanical engine based on an output of the engine speed analyzer.

28. A system for remotely analyzing a cyclo-mechanical engine, comprising:
a communication module coupled to a communication interface and configured to receive raw engine signal data associated with a plurality of cycles of a remotely located cyclo-mechanical engine over a communication interface; and
an engine speed analyzer configured to receive the raw engine signal data, to select a correlation operation based on a complexity of the raw engine signal data determined based on the raw engine signal data, and to compare, by performing the correlation operation, a first sample of the raw engine signal data with a second sample of the raw engine signal data to determine a cycle length of the cyclo-mechanical engine, to analyze the raw engine signal data, to detect a variation in the cycle length of the cyclo-mechanical engine over time based on the cycle length based on the analyzing of the raw engine signal data, to determine whether the variation in the cycle length is outside of a threshold, and to output a signal indicating an abnormal condition of the cyclo-mechanical engine responsive to the variation in the cycle length being outside of a threshold.

29. A method of analyzing a cyclo-mechanical engine, comprising:
detecting, via a sensor, an airflow signal associated with operation of the cyclo-mechanical engine;
determining a complexity of the airflow signal;
selecting a correlation operation based on the complexity of the airflow signal;
correlating a first sample of the airflow signal with a second sample of the airflow signal by performing the correlation operation to determine a cycle length of the cyclo-mechanical engine;
analyzing the airflow signal;
detecting a variation in the cycle length of the cyclo-mechanical engine over time based on the cycle length based on the analyzing of the engine signal;

determining whether the variation in the cycle length is outside of a threshold; and outputting a signal indicating an abnormal condition of the cyclo-mechanical engine responsive to the variation in the cycle length being outside of a threshold.

30. The method of claim 29, wherein the airflow signal comprises an exhaust signal.

31. The method of claim 29, wherein detecting the airflow signal comprises detecting the airflow signal using an airflow sensor in an air intake or exhaust.

32. The method of claim 29, wherein the airflow signal comprises an acoustic signal, and wherein detecting the airflow signal comprises detecting the airflow signal using a microphone.

33. The method of claim 29, further comprising:
receiving a cylinder timing signal from the cyclo-mechanical engine; and
comparing the cylinder timing signal with the airflow signal to identify which of a plurality of cylinders in the cyclo-mechanical engine is misfiring.

34. A method of analyzing a cyclo-mechanical engine, comprising:
detecting an engine signal associated with operation of the cyclo-mechanical engine;
comparing, based on a determined complexity of the engine signal, a first sample of the engine signal with a second sample of the engine signal to determine a cycle length of the cyclo-mechanical engine;
analyzing the engine signal
detecting a variation in a shape of the engine signal based on the analyzing of the engine signal to identify an anomaly in a characteristic pattern of the engine signal that is indicative of incomplete combustion in a cylinder in the cyclo-mechanical engine;
determining whether the anomaly in the characteristic pattern is outside of a threshold and
outputting a signal indicating an abnormal condition of the cyclo-mechanical engine responsive to the anomaly being outside of a threshold.

35. The method of claim 34, wherein identifying an anomaly in a characteristic pattern of the engine signal that is indicative of incomplete combustion in a cylinder in the cyclo-mechanical engine comprises analyzing the engine signal to detect a variation in a period of at least a portion of the engine signal.

36. The method of claim 34, wherein identifying an anomaly in a characteristic pattern of the engine signal that is indicative of incomplete combustion in a cylinder in the cyclo-mechanical engine comprises analyzing the engine signal to determine a probability of a dirty or clogged valve or clogged fuel injector in the cyclo-mechanical engine.

37. The method of claim 1, wherein determining a complexity of the engine signal comprises determining a number of cylinders of the cyclo-mechanical engine.

38. The method of claim 1, wherein outputting the signal indicating the abnormal condition responsive to the variation the cycle length being outside the threshold comprises outputting the signal indicating the abnormal condition responsive to a variation in the cycle length of adjacent durations of the engine signal being outside the threshold.

* * * * *